(12) United States Patent
Baarman et al.

(10) Patent No.: US 9,190,858 B2
(45) Date of Patent: *Nov. 17, 2015

(54) WIRELESS CHARGING SYSTEM WITH DEVICE POWER COMPLIANCE

(71) Applicant: Access Business Group International LLC, Ada, MI (US)

(72) Inventors: David W. Baarman, Fennville, MI (US); Scott A. Mollema, Rockford, MI (US)

(73) Assignee: ACCESS BUSINESS GROUP INTERNATIONAL LLC, Ada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/721,736

(22) Filed: Dec. 20, 2012

(65) Prior Publication Data

US 2013/0106364 A1    May 2, 2013

Related U.S. Application Data

(63) Continuation of application No. 12/652,053, filed on Jan. 5, 2010, now Pat. No. 8,373,386.

(60) Provisional application No. 61/142,663, filed on Jan. 6, 2009.

(51) Int. Cl.
*H02J 7/00* (2006.01)
*H02J 5/00* (2006.01)
(Continued)

(52) U.S. Cl.
CPC .............. *H02J 7/0052* (2013.01); *H01F 38/14* (2013.01); *H02J 5/005* (2013.01); *H02J 7/0006* (2013.01); *H02J 7/025* (2013.01)

(58) Field of Classification Search
USPC ........................................................ 320/108
See application file for complete search history.

(56) References Cited

U.S. PATENT DOCUMENTS 7,076,206 B2    7/2006   Elferich et al.
7,109,682 B2    9/2006   Takagi et al.
(Continued)

FOREIGN PATENT DOCUMENTS

JP    2002-93444    3/2002
JP    2004-64960    2/2004
(Continued)

OTHER PUBLICATIONS

International Search Report, International Application No. PCT/US2010/020061, mailed Jul. 4, 2010.
(Continued)

*Primary Examiner* — Samuel Berhanu
(74) *Attorney, Agent, or Firm* — Warner, Norcross & Judd, LLP

(57) ABSTRACT

A method of controlling an inductive charging system on those occasions in which the combined power requests of a plurality of secondary devices exceed the power capacity of the power supply. The method includes at least one of (a) powering each device at a level below its requested level, (b) powering each device sequentially, and/or (c) powering each device in a repetitive pattern (e.g. time multiplexing). Also disclosed is a method of controlling an inductive charging system at least partially as a function of information received from the power management unit (PMU) of each secondary device.

17 Claims, 23 Drawing Sheets

(51) Int. Cl.
*H02J 7/02* (2006.01)
*H01F 38/14* (2006.01)

(56) References Cited

U.S. PATENT DOCUMENTS

| | | |
|---|---|---|
| 7,164,255 B2 | 1/2007 | Hui |
| 2003/0214821 A1 | 11/2003 | Giannopoulos et al. |
| 2004/0130915 A1 | 7/2004 | Baarman |
| 2004/0145342 A1 | 7/2004 | Lyon |
| 2004/0253489 A1* | 12/2004 | Horgan et al. ............ 429/13 |
| 2005/0007067 A1 | 1/2005 | Baarman et al. |
| 2007/0145830 A1 | 6/2007 | Lee et al. |
| 2007/0279002 A1 | 12/2007 | Partovi |
| 2008/0197802 A1 | 8/2008 | Onishi et al. |
| 2008/0203973 A1 | 8/2008 | Gale et al. |
| 2008/0315826 A1 | 12/2008 | Alberth, Jr. et al. |
| 2009/0079268 A1 | 3/2009 | Cook et al. |
| 2009/0096413 A1* | 4/2009 | Partovi et al. ............ 320/108 |
| 2009/0284082 A1 | 11/2009 | Mohammadian |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2010/0151808 A1 | 6/2010 | Toncich et al. |
| 2010/0201189 A1 | 8/2010 | Kirby et al. |
| 2011/0266878 A9 | 11/2011 | Cook et al. |

FOREIGN PATENT DOCUMENTS

| | | |
|---|---|---|
| JP | 2004-236492 | 8/2004 |
| WO | 2005/122686 | 12/2005 |
| WO | 2006/001557 | 1/2006 |
| WO | 2008/137996 | 11/2008 |

OTHER PUBLICATIONS

Written Opinion of the International Searching Authority, International Application No. PCT/US2010/020061, mailed Jul. 4, 2010.

* cited by examiner

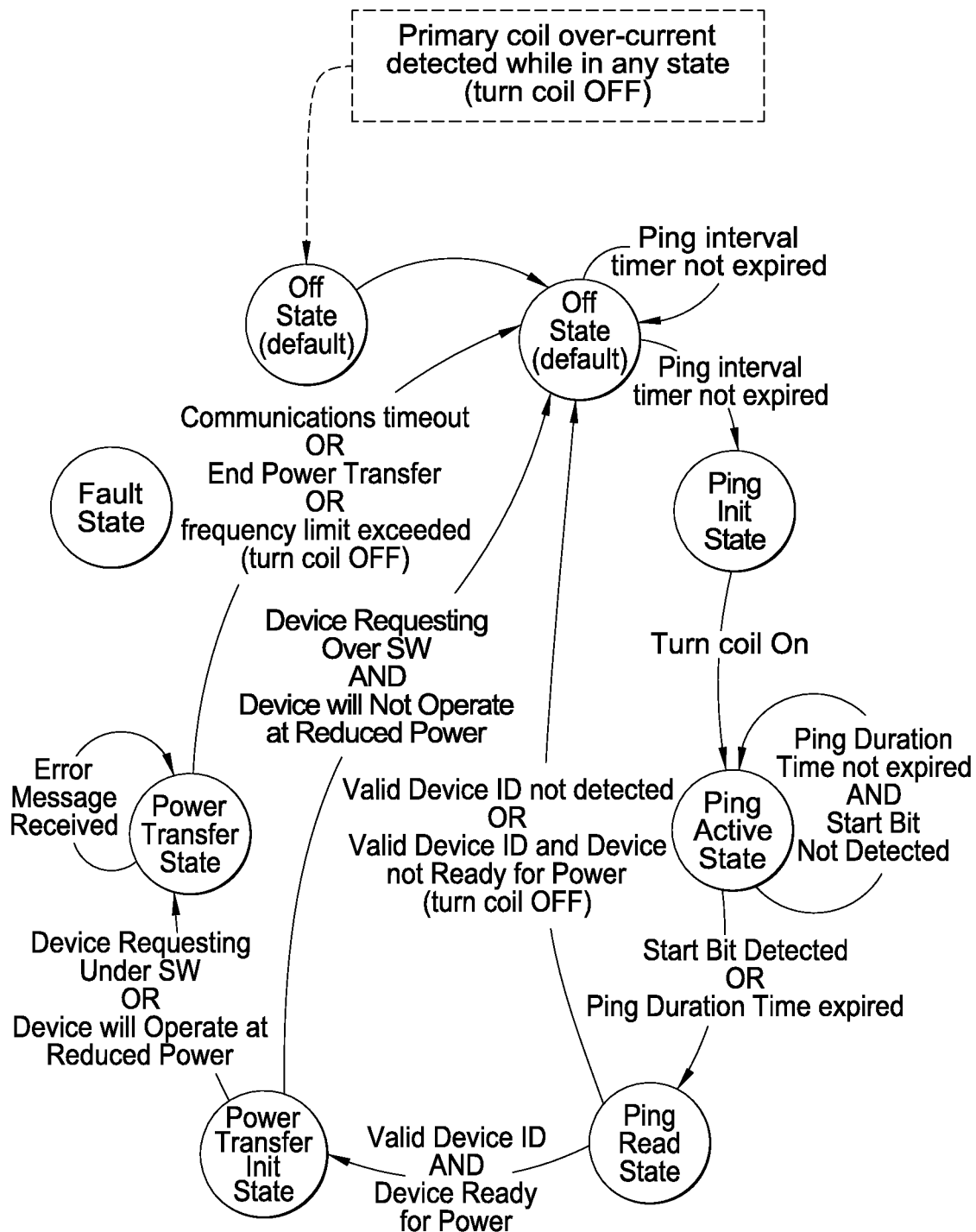
FIG. 1.5

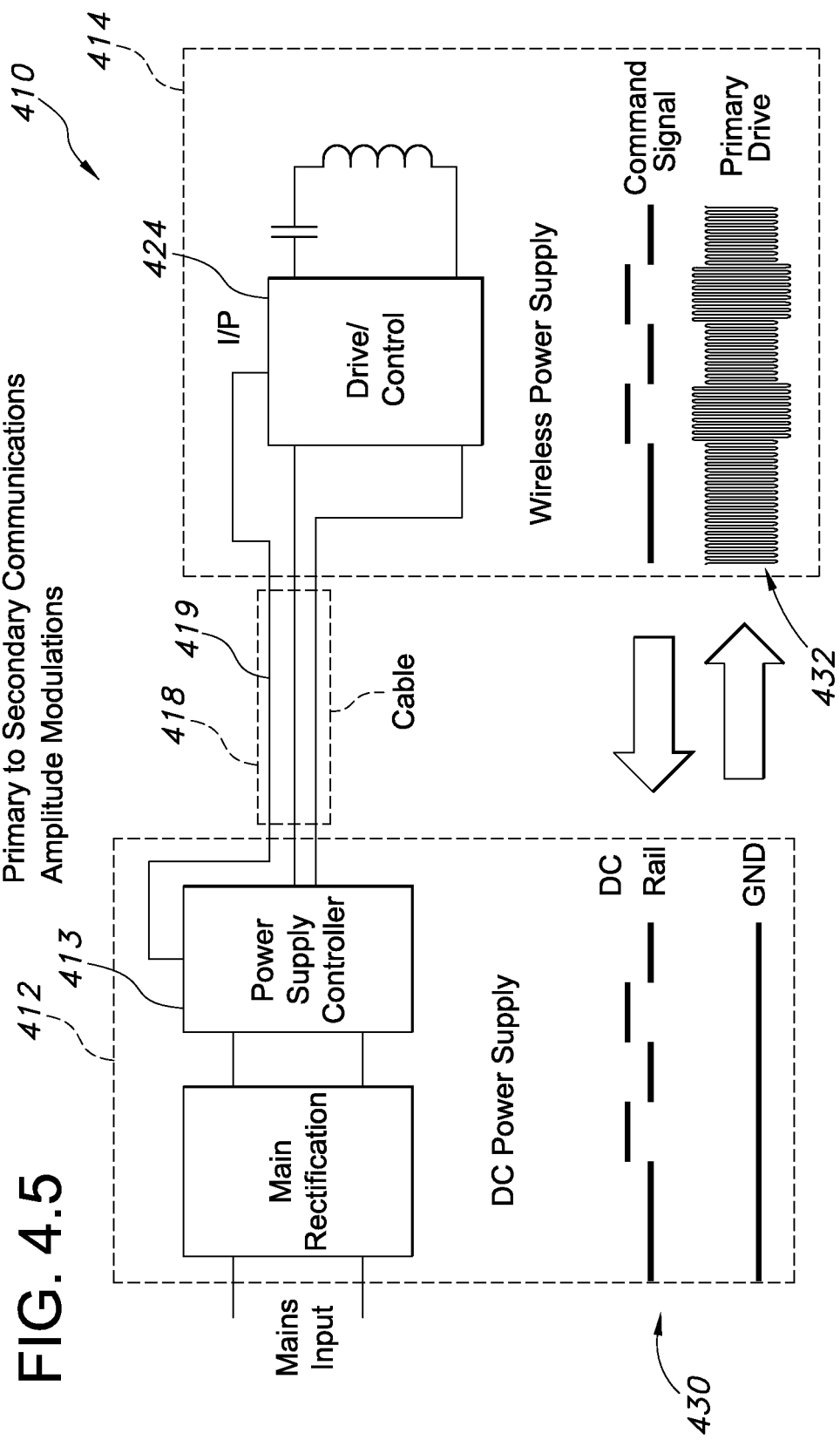
FIG. 4.5

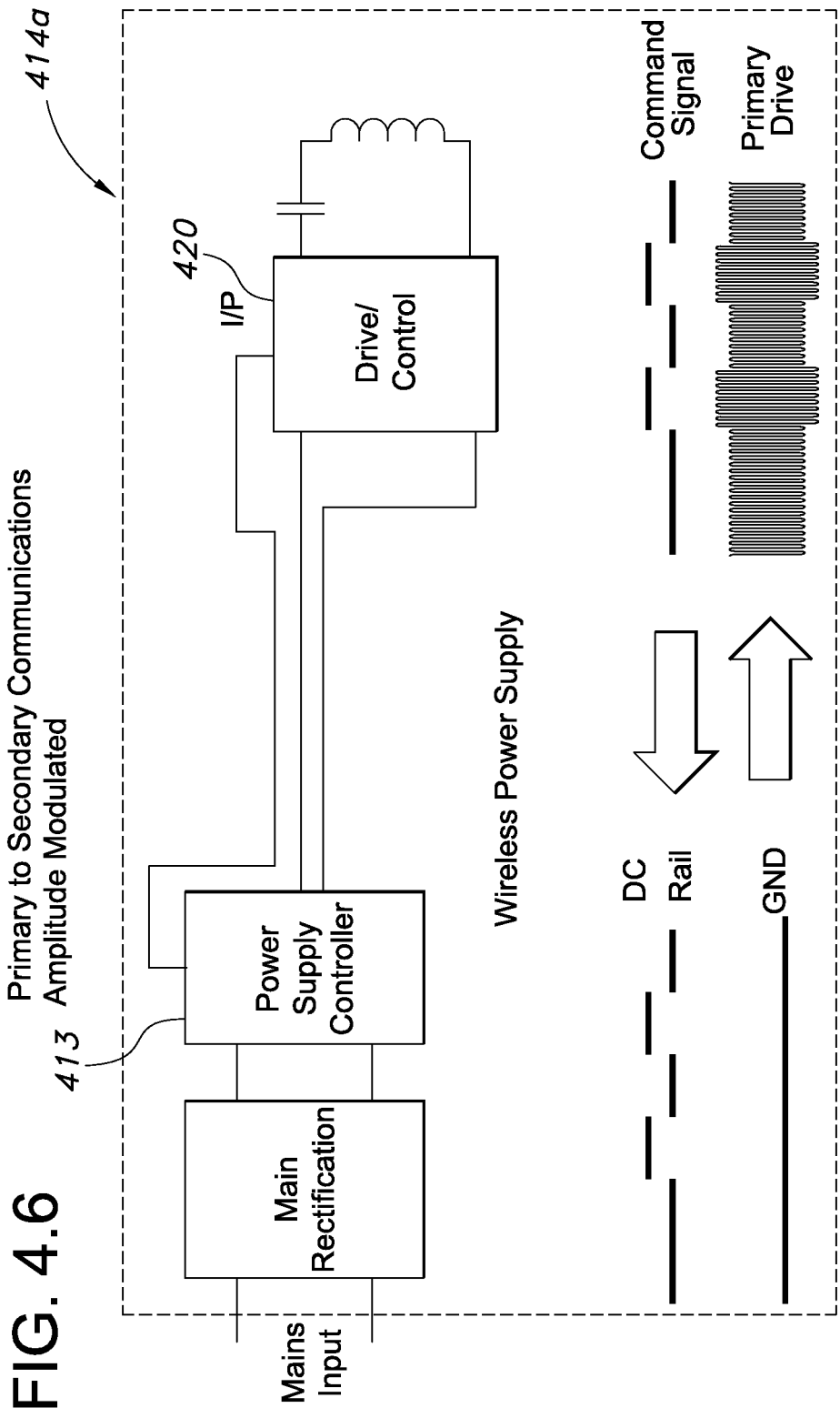
FIG. 4.6

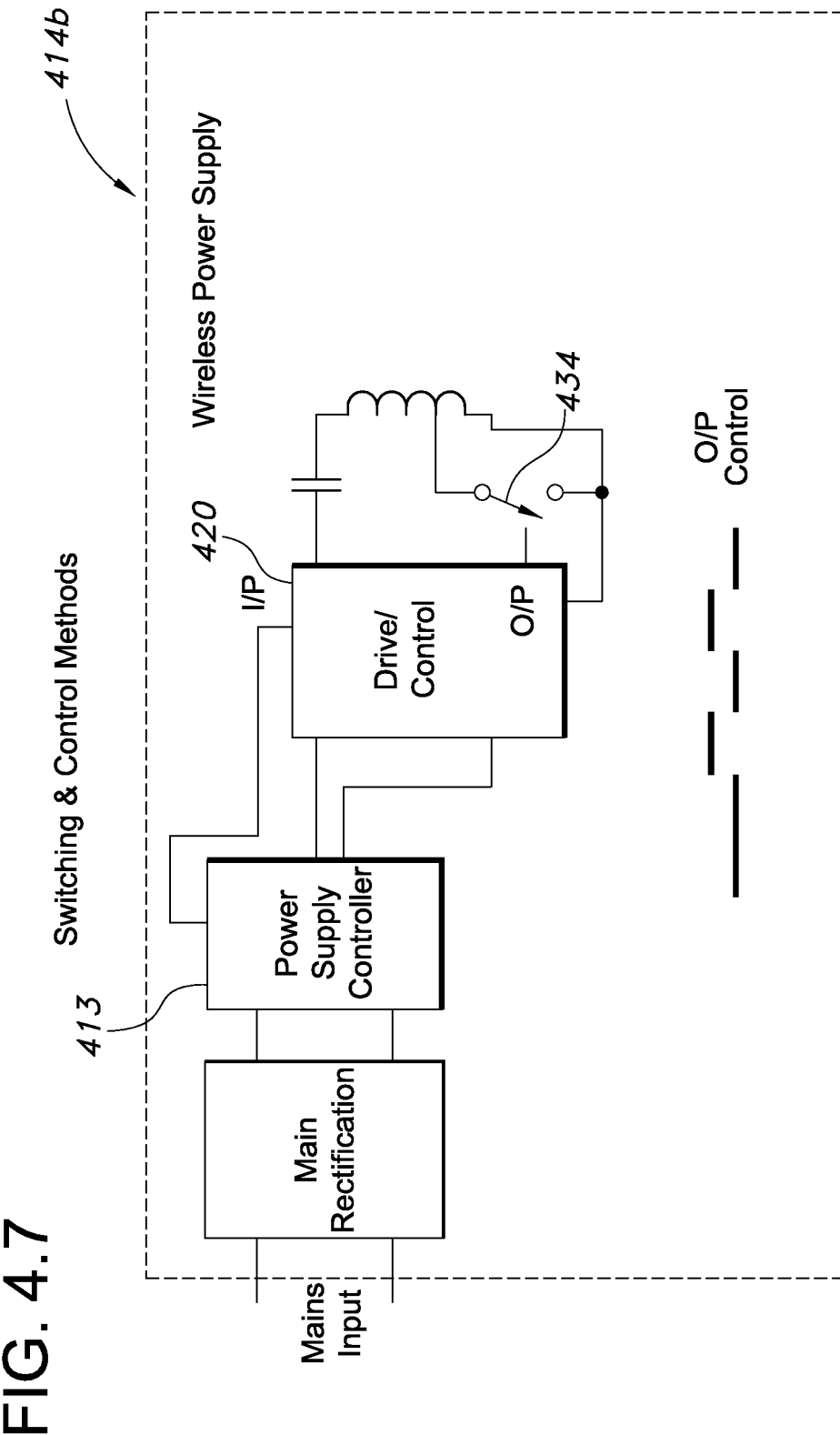
FIG. 4.7

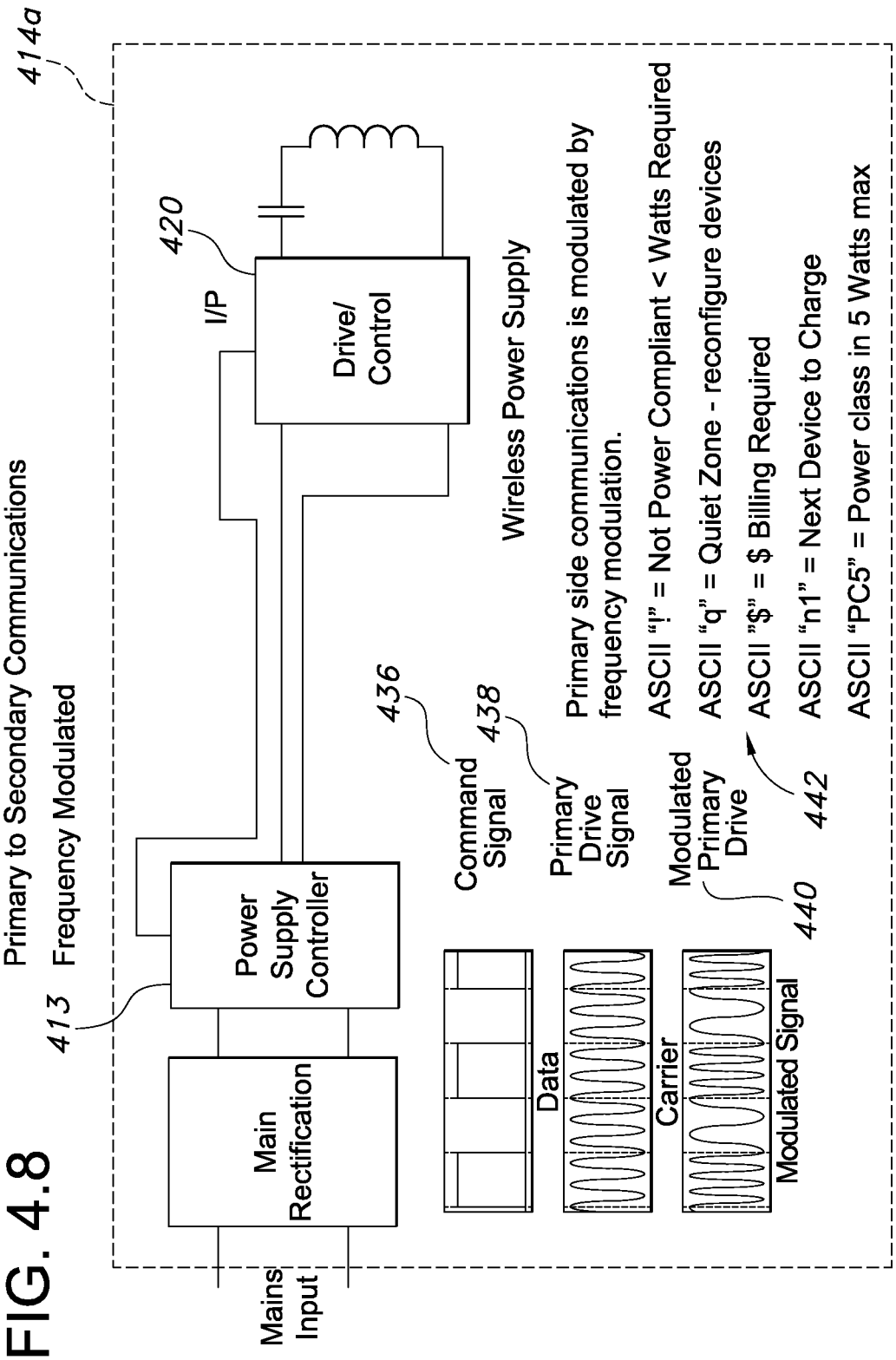
FIG. 4.8

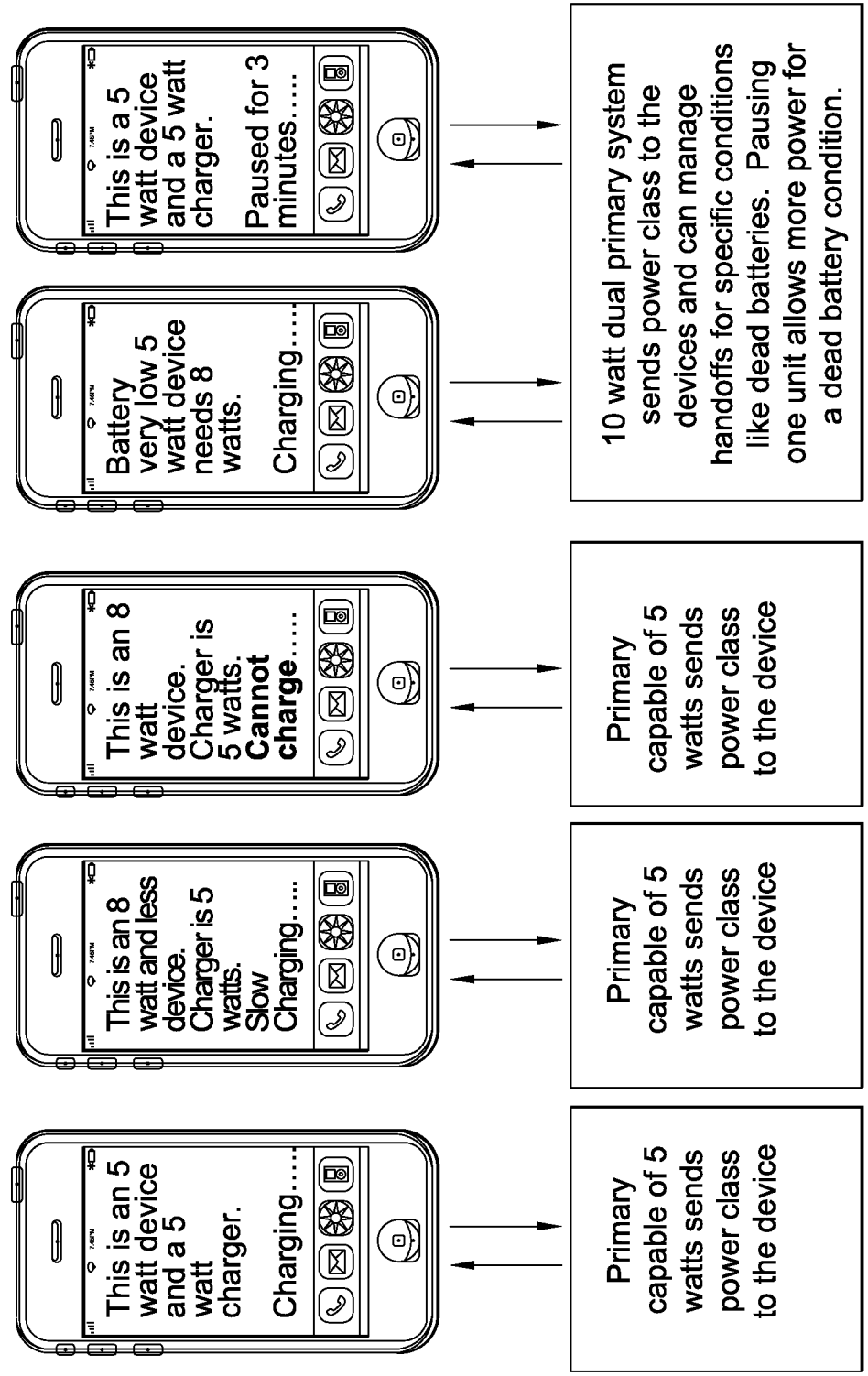
FIG. 4.85

FIG. 4.86
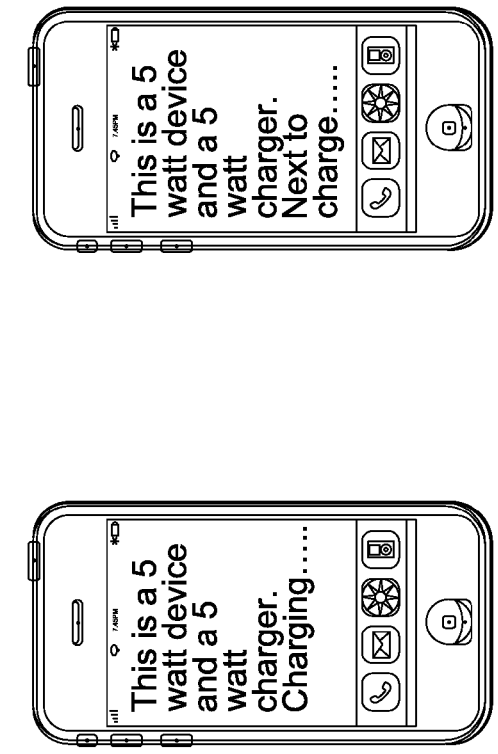
Power Accounting and communications

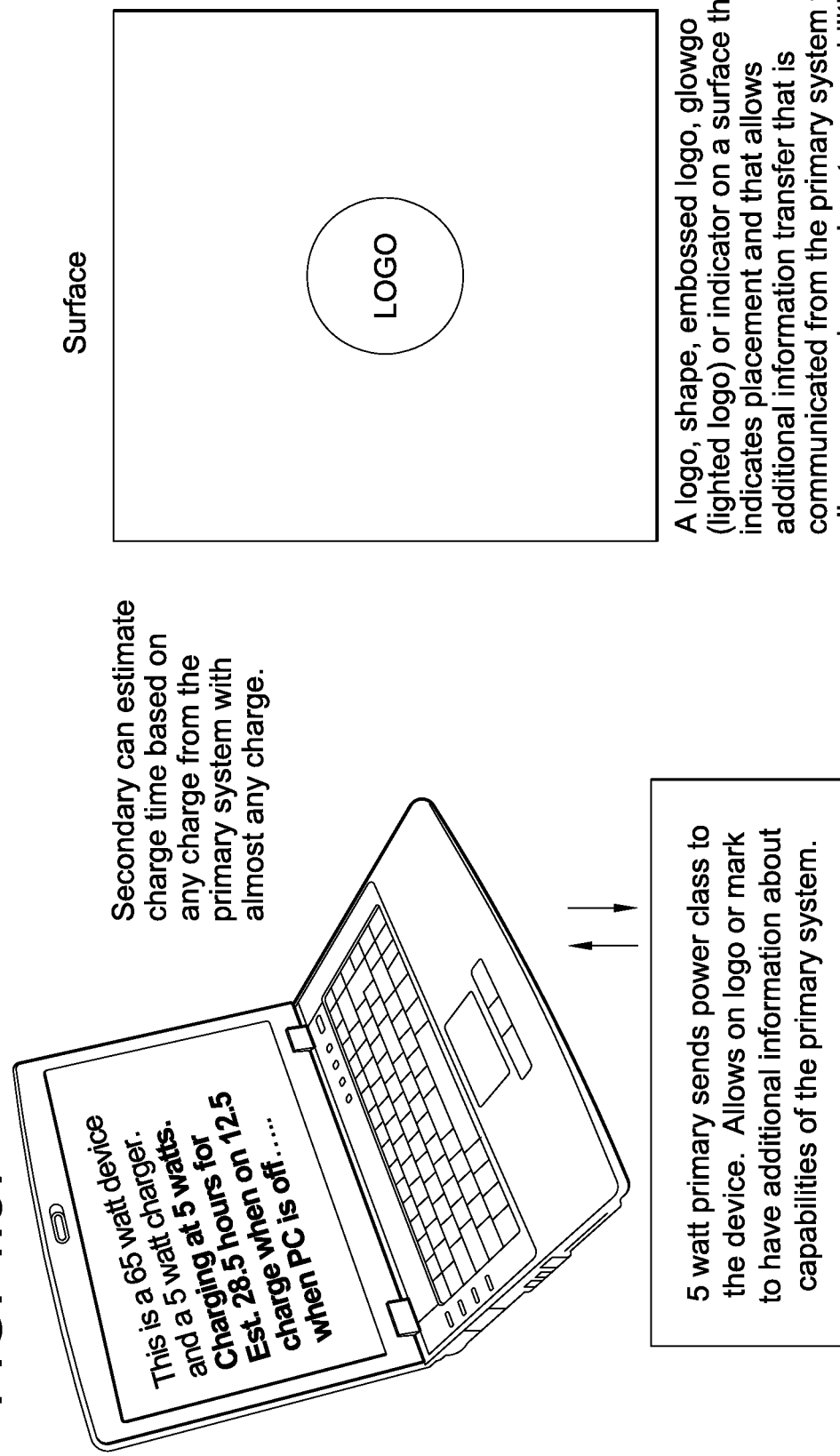

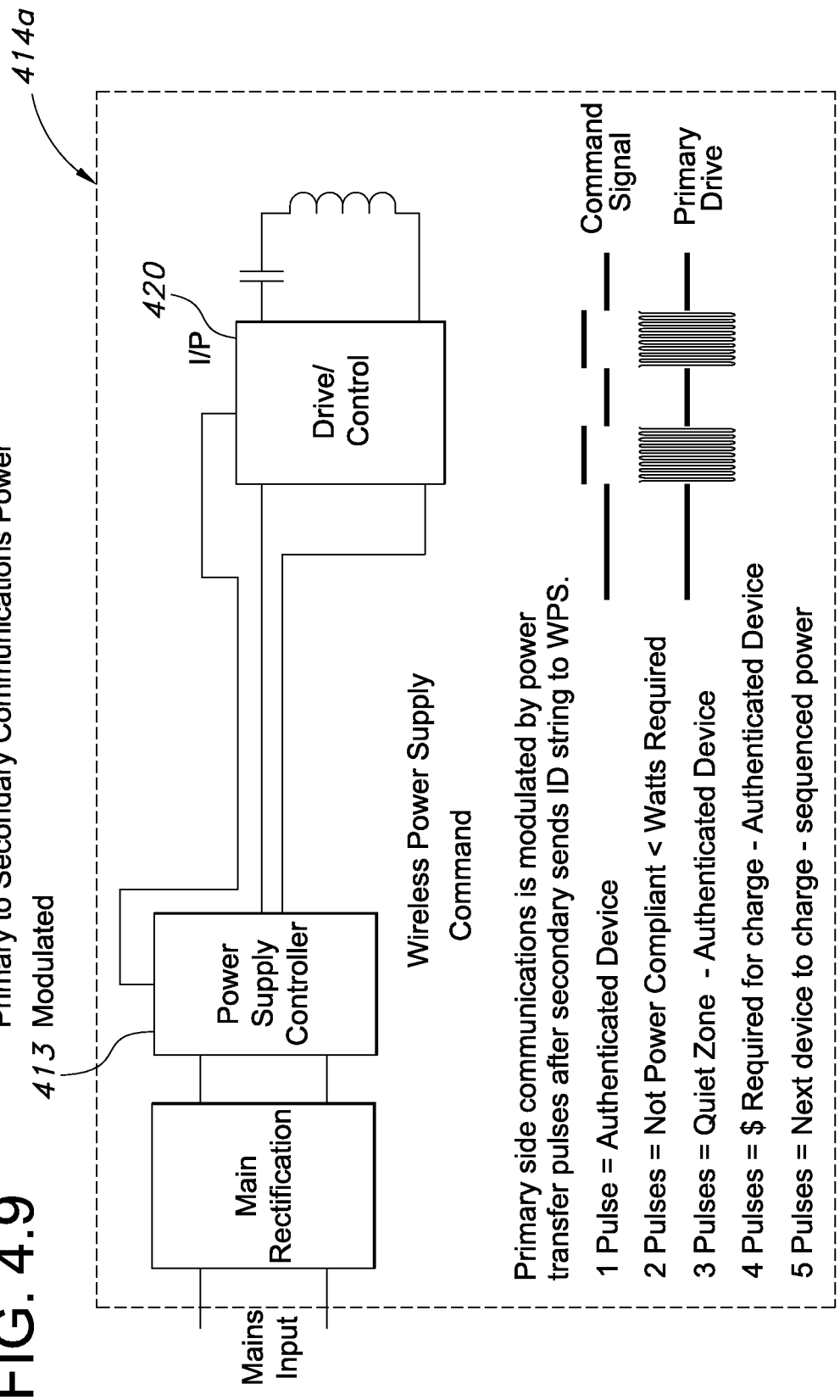
FIG. 4.9

Power Supply Communication of Wattage Using Analog Table

Specified Low Power Wattage is 15

| Vcc | R1 | R2 | Output | (Spec Wattage/Vcc) * Output |
|---|---|---|---|---|
| 5 | 200000 | 0 | 0 | 0 |
| 5 | 180000 | 20000 | 0.5 | 1.5 |
| 5 | 160000 | 40000 | 1 | 3 |
| 5 | 140000 | 60000 | 1.5 | 4.5 |
| 5 | 120000 | 80000 | 2 | 6 |
| 5 | 100000 | 100000 | 2.5 | 7.5 |
| 5 | 80000 | 120000 | 3 | 9 |
| 5 | 60000 | 140000 | 3.5 | 10.5 |
| 5 | 40000 | 160000 | 4 | 12 |
| 5 | 20000 | 180000 | 4.5 | 13.5 |
| 5 | 0 | 200000 | 5 | 15 |

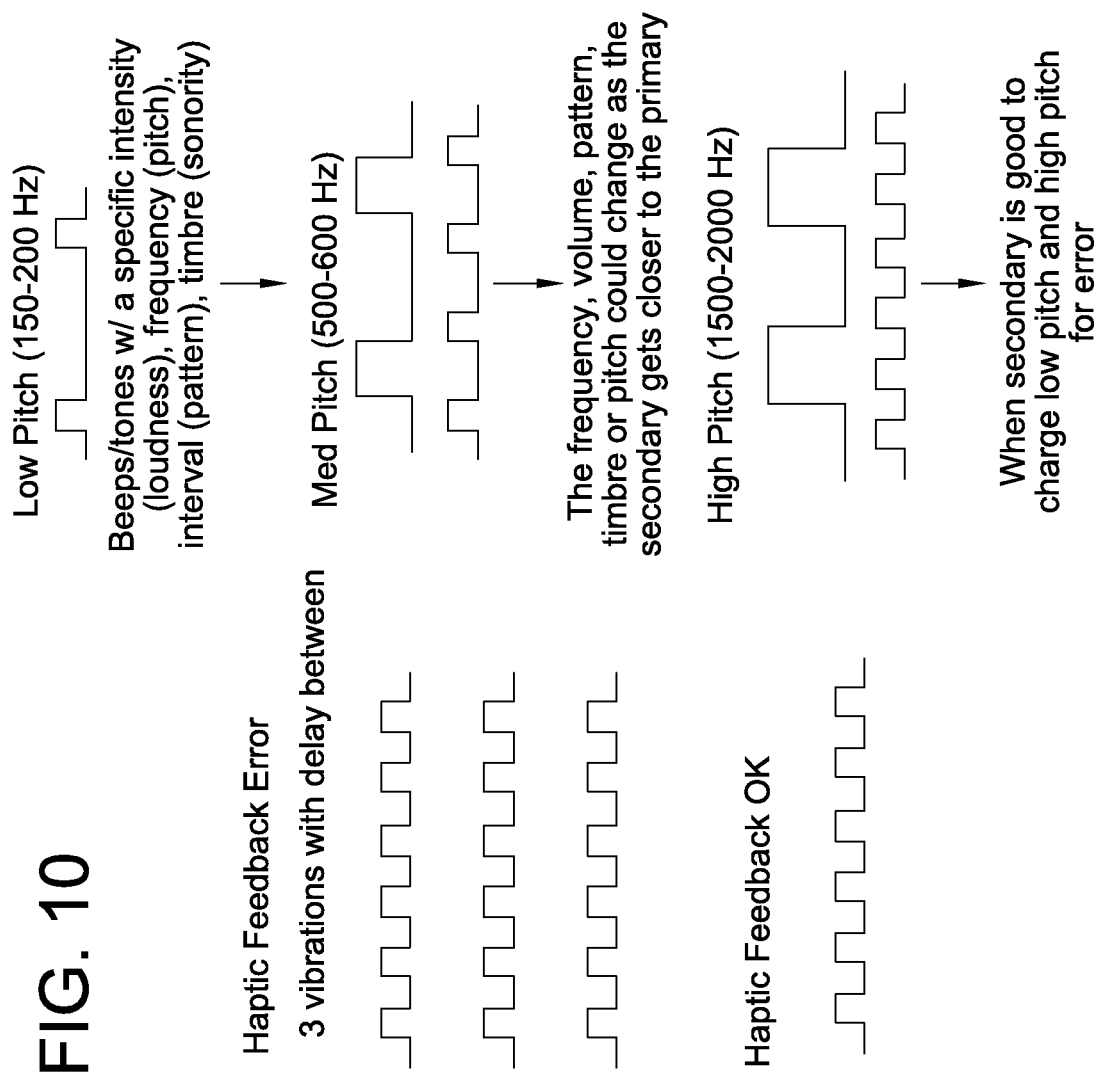

FIG. 11

Two Device Capable Wireless Power Supply

| Sequence | Device | Device Wattage | Device Need | System Capacity | Charging Status WPS | Charging Status Device | Display Status | 2nd Device Start Point | After Priority Charge |
|---|---|---|---|---|---|---|---|---|---|
| 1 | Cell Phone | 5 | 5 | 10 | OK | OK | Charging | NA | OK |
| 2 | Cell Phone | 5 | 5 | 10 | OK | OK | Charging | NA | OK |
| 1 | Cell Phone | 5 | 5 | 10 | OK | OK | Charging | <2 Watts | OK |
| 2 | DV Recorder | 8 | 8 | 10 | Warning | Warning | Next to Charge | NA | OK |
| 1 | DV Recorder | 8 | 8 | 10 | OK | OK | Charging | <5 Watts | OK |
| 2 | Cell Phone | 5 | 5 | 10 | Warning | Warning | Next to Charge | NA | OK |
| 1 | DV Recorder | 8 | 8 | 15 | OK | OK | Charging | NA | OK |
| 2 | Cell Phone | 5 | 5 | 15 | OK | OK | Charging | NA | OK |
| 1 | Cell Phone | 5 | 5 | 10 | OK | OK | Charging | NA | OK |
| 2 | DV Recorder | 8 | 5 | 10 | OK | OK | Charging | NA | OK |
| 1 | Cell Phone | 5 | 5 | 5 | OK | OK | Charging | EOC | OK |
| 2 | Cell Phone | 5 | 5 | 5 | Warning | Warning | Next to Charge | NA | OK |

Note: Warning indicates the device to be charged is in queue for charging based on priority placement.

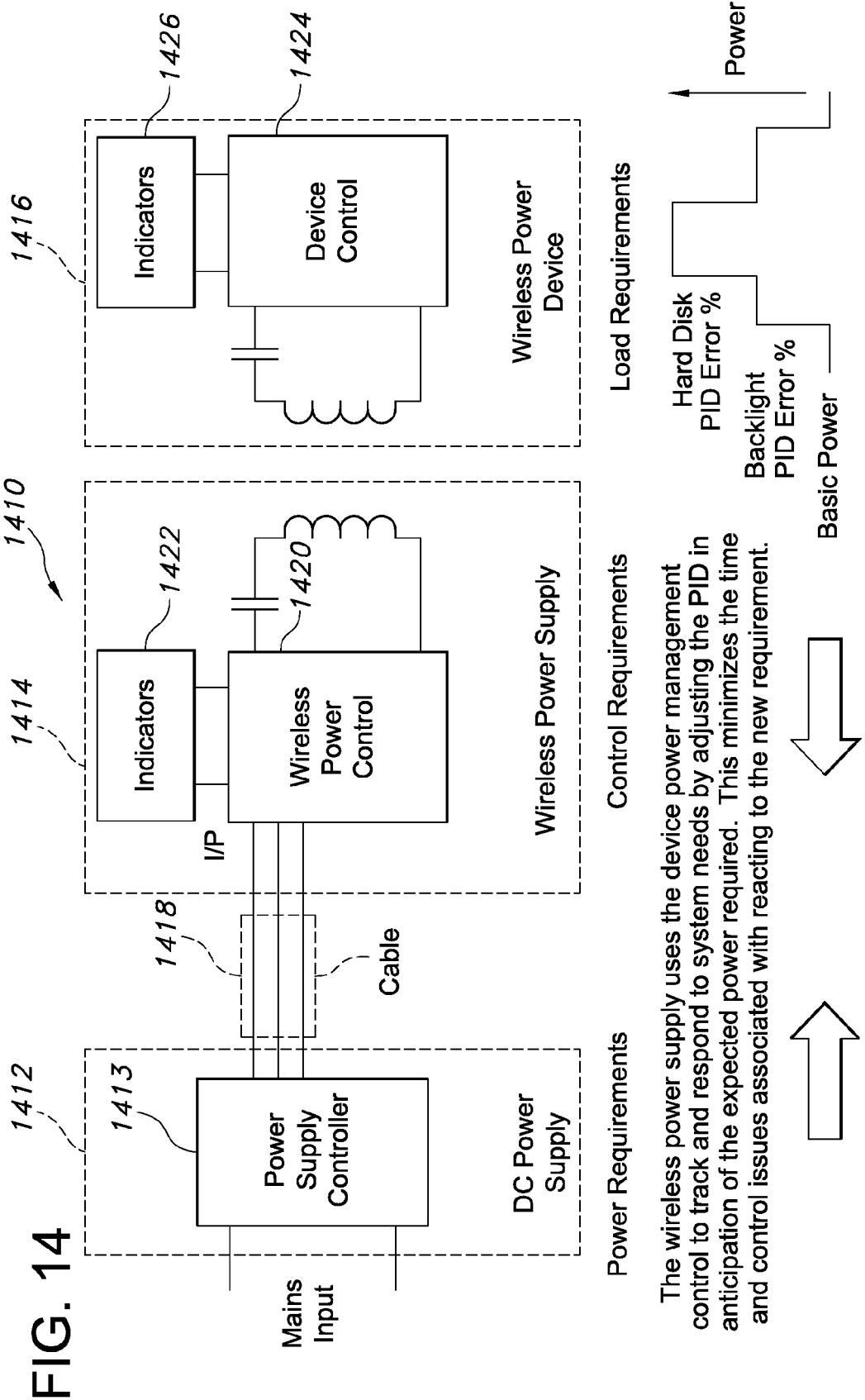

WIRELESS CHARGING SYSTEM WITH DEVICE POWER COMPLIANCE

This application is related to U.S. application Ser. No. 12/349,355, entitled "Metered Delivery of Wireless Power" filed Jan. 6, 2009, now U.S. Pat. No. 8,069,100, which is incorporated by reference.

BACKGROUND OF THE INVENTION

The present invention relates to wireless power systems and more particularly to such systems capable of powering multiple devices simultaneously.

Wireless power or charging systems are well known and widely used. Such systems typically include a primary power supply and one or more secondary devices. The primary inductively powers the secondary devices when they are brought into proximity with the primary.

While such systems are well known, a number of potential problems are associated with such systems.

First, each primary supply is typically sized for a particular application depending upon the power to be drawn from the power supply. Issues arise when the power requirements of the secondary devices are greater than the power capacity of the primary supply. The secondary device may shut down, or the secondary device may attempt to charge at the reduced power level available which may not be appropriate for the device. Typically either result happens without feedback or warning to the user. Consequently, the device may be charged improperly or not at all.

Second, multiple power supplies typically are required for multiple secondary devices—i.e. one for each device. This can result in a multitude of power supplies, which are expensive and difficult to store, use, and match with the secondary devices.

SUMMARY OF THE INVENTION

The aforementioned problems are overcome in the present invention in which the various components within the wireless power system communicate power requirements and capabilities to one another so that power compliance can be managed. More specifically, each secondary device can communicate with the wireless power supply to provide an indication of the power requirements of each device; and conversely, the power supply can communicate with each secondary device to provide an indication of the power capacity of the supply.

A wireless power control can then solve for power distribution requirements among the power supply and the secondary units. The control can provide an alert if the power requirement of the secondary device exceeds the system capacity. The control also enables charging at a reduced power level. If multiple secondary devices are brought into the charging system, the control can distribute power among the devices.

Consequently, the present invention provides enhanced power compliance within a wireless charging system. The system provides an indication of mismatches between power capacity and power requirements and also provides power distribution among multiple devices to enable multiple devices to be charged using a single power supply.

These and other objects, advantages, and features of the invention will be more fully understood and appreciated by reference to the description of the current embodiments and the drawings.

BRIEF DESCRIPTION OF THE DRAWINGS

FIG. 1.5 is a state diagram for the wireless power control;

FIG. 4.5 is a schematic illustration of the wireless charging system showing the communications used to communicate information between the primary and the secondary;

FIG. 4.6 is a schematic illustration showing a first alternate embodiment of the power supply;

FIG. 4.7 is a schematic illustration of a second alternate embodiment of the primary;

FIG. 4.8 is a schematic illustration of a third alternate embodiment of the wireless charging system;

FIGS. 4.85, 4.86, and 4.87 are schematic illustrations of power accounting and communications protocols;

FIG. 4.9 is a schematic illustration of another alternative embodiment of the primary;

FIG. 10 shows a basic feedback mechanism that can be understood by touch or sound;

FIG. 11 shows a placement sequence table that provides outcomes and events;

FIG. 14 is a schematic illustration of the wireless charging system providing further improved control, regulation, and anticipation of power fluctuations.

DESCRIPTION OF THE CURRENT EMBODIMENTS

Figure 1:
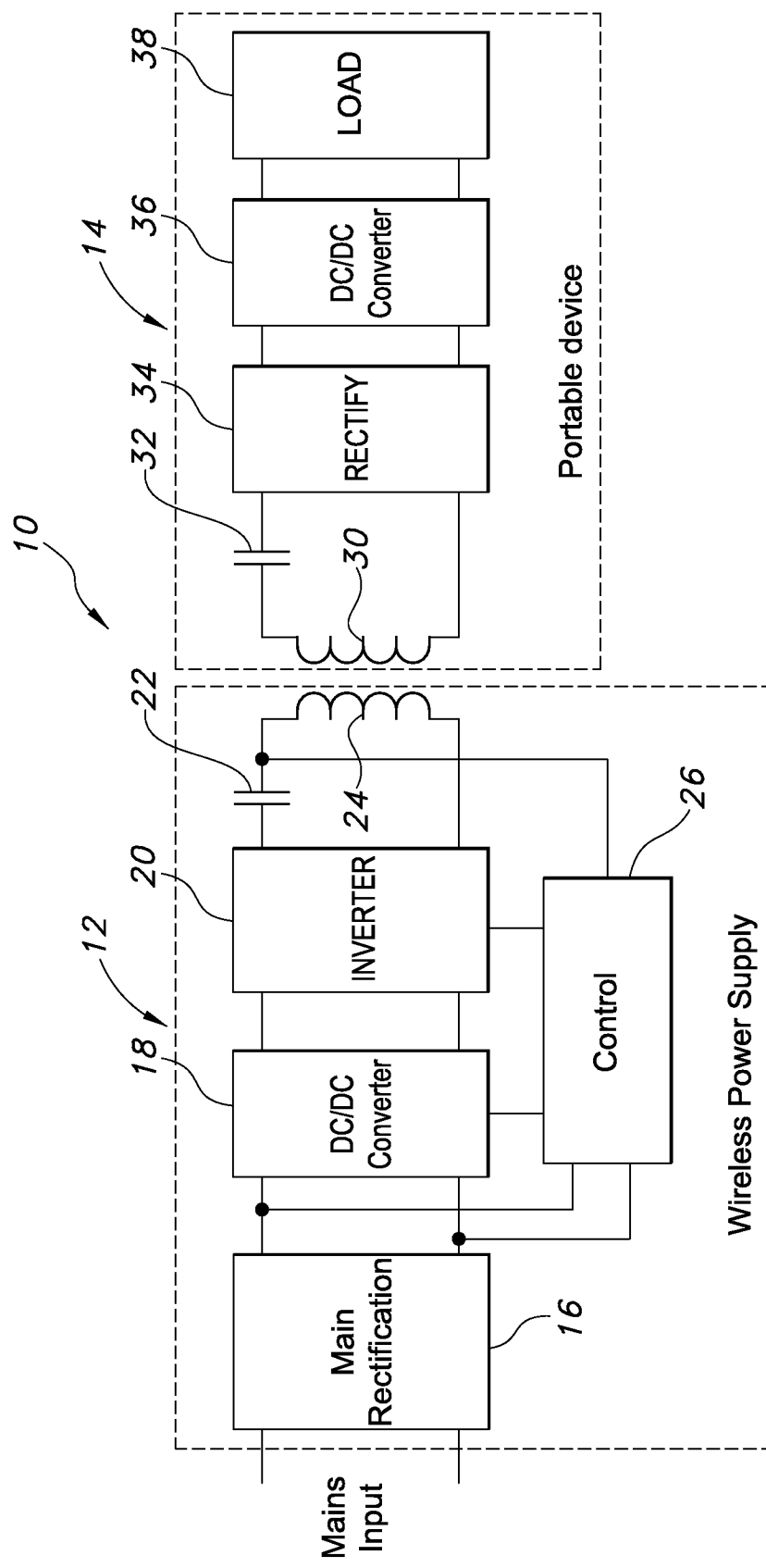
FIG. 1 is a schematic illustration of a prior art wireless power or charging system.

A prior art wireless charging system 10 is illustrated in FIG. 1 and includes a wireless power supply (WPS) 12 and a portable secondary device 14. The wireless power supply 12 in turn includes a rectifier 16, a DC/DC converter 18, an inverter 20, a capacitor 22, an inductive coil 24, and a control 26. The portable device 14 includes a secondary coil 30, a capacitor 32, a rectifier 34, a DC/DC converter 36, and a load 38. When the secondary coil 30 is brought into proximity to the primary coil 24, and when the primary coil is powered, an inductive link is established; and a voltage is induced in the secondary coil. The wireless charging system 10 as thus far described is well known and its structure and function need not be further described in detail.

Power systems such as that illustrated in FIG. 1 typically require the user to understand and remember what devices and what power supplies work together. Two different power supplies with different power capacities, but also with the same connector, can physically connect to the same device. However, use of the incorrect supply with a device can potentially cause failure or improper operation. The user becomes aware of such failure or improper operation only through some type of failure mode, such as over-powering of the device or failure to charge the device.

The present invention enables the power systems and the secondary devices to communicate with each other and to be configurable and to manage power compliance among the various components of the system.

In the past power systems have been dependant on the user to know and understand what devices and power supplies work together. Two different power supplies with the same connector can easily connect to the same device. This can potentially cause failure or improper operation. The user knows this only by the failure mode.

This invention seeks to solve this issue by allowing power systems to communicate and be configurable. Devices can communicate with power supplies and supplies with devices all communicating to the user.

Power Supply Compliance

The power supply and wireless power supply both communicate capacity respectively and can solve for power distribution requirements. The information from remote power supplies or internal power supplies is communicated to the wireless power control. The system is designed to alert the user by way of primary to secondary communications that the device requires more power than the wireless power supply and the main power supply are capable of supplying.

Primary to Secondary Communications

There are multiple ways to communicate information from the primary to the secondary, for example, as disclosed in this application. Some methods involve small variances—around 1% to 2% of the power to modulate a simple signal. Other methods stop oscillation completely for short periods to send very basic signals. These basic communications enable the following features:

Primary request for an authorization to charge—billing
Authentication for proper charge—authentication handshake
Not enough power available for this device—less than wattage required available
Communications of sequence for charge—next to charge—$2^{nd}$ in line for a charge
Configuration of a device—mute, vibrate, radio off
Non compliance with the standard

Smaller Power Supplies Charging Multiple Devices

As one example, the present invention enables a single five-watt power supply to charge several five-watt devices in sequence. Each device communicates charge ratio (power in vs. power used over time) and need for charge (present capacity). Using these ratios from each device, the charge can be split and sequenced allowing many devices to have proper power with a very limited charge. This approach is like passing the charge cable around the table as needed, but doing so only wirelessly. One exemplary use is a conference table with several laptops. Only one laptop really needs to be charged at a time. The sequencing eliminates the need for having the ability to cover the wattage of all the devices at maximum power and lowers the cost of implementation.

Wireless Power Enhancement Utilizing Power Management Interface

The wireless power supply includes the power management unit. In prior art systems include backlighting, radios, hard drives, GSM pulses, and the like that are turned on and off, the power supply is designed to react to these systems and provide stable power. The present invention uses knowledge from the system when aspects of the system that require power are being turned on and off to efficiently manage the control by anticipating a percentage of change based on the power impact. This knowledge allows the power supply to react directly to the need. In prior art systems, a proportional-integral-derivative (PID) control loop saves time by eliminating multiple passes of the loop; and the system can respond more quickly. By connecting the power management unit (PMU) of the secondary device and assigning error values for each load, the sum of the change in load can be easily transferred from the power management unit to the secondary wireless power control and then communicated to the wireless power supply to improve loop reaction time.

General Control Description

The error-based control mode allows for a control loop configuration between the secondary control interface (SCI) and primary control interface (PCI). The PCI responds to the control error feedback packet from the SCI to determine the adjustment needed to reach the operating point. This provides for significant design freedom. A variety of types of control can be implemented on the secondary side. Examples of algorithms include constant current, constant voltage, or constant power. The state diagram in FIG. 1.5 sets forth the algorithm used in this control method.

Predictive PID Control

The PID system error and timing can be coordinated between the wireless power primary control and the secondary receiver and the power management systems. Table 1 shows how this timing and power can be used to formulate the additional required power that will be required and the minimum timing used to coordinate these systems. Arbitrary current and timing are shown as an example. These values can be pre-measured for best overall system performance and stored in the secondary system for coordination with the power management system.

TABLE 1

Power management table for a portable device showing the control values used when the LCD, GSM and Bluetooth need to be enabled.
Power Management Table Portable Device

| Power System | Power | System Enabled | System Delta |
|---|---|---|---|
| Main Processor | 200 ma | | |
| LCD Backlight | 200 ma | X | 550 mA |
| GSM Radio | 300 ma | X | |
| Bluetooth Radio | 50 ma | X | |
| Commmunications | 25 ma | | |
| Camera LED | 80 ma | | |

The Coil_Current_Setpoint is then calculated using the measured value plus the sum of the new control value as a sum of Table 1. This allows the system to have much faster control by limiting the number of loops required for course control.

This coarse control allows less ripple by limiting the time required for the PID to respond as this allows predictive and reactive input.

TABLE 2

Timing of Control

| | Time |
|---|---|
| | 0  10  20  30  40  50  60 |
| Priority PID Command | |
| LCD Backlight | |
| GSM Radio | |
| Bluetooth Radio | |

Timing of control for primary and secondary side power management coordination. It should be noted latency of power control for each system may be considered for control.

PID Control

The control algorithm uses a PID method of control. The PID control algorithm is not run continuously, as this is more likely to result in corrupted data communication. Instead, the PID algorithm attempts to change the primary coil current to a calculated operating point between the reception of control feedback packets (CFP).

The SCI preferably does not attempt communication during the time in which the PID algorithm is active. The minimum timing between control error feedback packets is defined within the Device ID payload.

A generic PID controller is represented in Table 3. This math is recreated within the PCI.

TABLE 3

Generic PID Controller

New Coil Current Calculation

The PCI coil current signal used by the PID control loop is sampled by the A/D and a rolling average is calculated. The algorithm calculates a new target PCI coil current each time a non-zero control error feedback packet is received from the SCI using the following equation:

$$\text{Coil\_Current\_Setpoint} = \frac{(\text{Previous\_Setpoint} * \text{Max\_Error\_Counts})}{(\text{Feedback\_Error} + \text{Max\_Error\_Counts})} \quad (2)$$

The "Feedback_Error" is defined as the payload of the control error packet transmitted by the SCI:

Feedback_Error=Reactive_Error+Predictive_Error

If the Feedback_Error is zero, the PID control loop is not run, because no adjustment to the operating point is necessary.

The "Previous_Setpoint" is defined as the most recent stabilized primary coil current for the initial run of the PID loop, or the last stabilized primary coil current following an adjustment.

The "Max_Error_Counts" is defined as the maximum error that can be reported by the SCI. In the current embodiment, this is within a range of +/−127.

The coil current returns to a steady state prior to activating the PID so that error calculations are accurate and the required number of frequency adjustments is minimized. The algorithm waits for the coil current to stabilize following the reception of a data packet from the SCI, determined by the "PID Delay Time" parameter. The correct delay period is based upon the maximum amount of time required for the PCI coil current to return to its steady state following data communications and the filter delays of the feedback signal to the primary A/D.

The following calculation is made to achieve the new operating point:

Calculated_Error=Previous_Setpoint_Coil_Current_Setpoint (2)

Proportional Calculation

The proportional term of the algorithm is calculated in the equation below.

P Proportional_Term=Calculated_Error*$K$ (3)

Integral Calculation

The integral term of the algorithm is calculated in the equation below.

$$\text{Integral\_Term} = \frac{\text{Calculated\_Error} * K}{\text{Integral\_Update\_Interval}} + \text{Previous\_Integral\_Term} \quad (5)$$

Where Integral Update Interval is a gain adjustment based on the desired integration rate. Wind-up is controlled using the Integral Upper Limit and Integral Lower Limit parameters.

Derivative Calculation

The derivative term of the algorithm is calculated in the equation below.

$$\text{Derivative\_Term} = \frac{(\text{Calculated\_Error Previous\_Calculated\_Error}) * K}{\text{Derivative\_Update\_Interval}} \quad (6)$$

Where Derivative Update Interval is a gain adjustment based on the desired differentiation rate.

Total PID Calculation

The total PID calculation is the sum of the proportional, integral, and derivative terms.

$$PID\_Output = Proportional\_Term + Integral\_Term + Derivative\_Term \quad (6)$$

Maximum output is controlled using the PID Output Upper Limit and PID Output Lower Limit parameters.

Updated Operational Point Calculation

The final frequency adjustment is calculated in the equation below.

$$Frequency\_Output = Frequency\_Output + \frac{(PID\_Output * Gain\_Correction\_Factor)}{PID\_Scale\_Factor} \quad (7)$$

The "Gain_Correction_Factor" divides the resonance curve into piecewise linear functions.

The "PID_Scale_Factor" is used to help with the integer math in the PID calculations.

Once the "PID Delay Time" has expired, the PID loop actively attempts to bring the PCI coil current to the new target set-point using the equations above during the "PID Active Time".

Finally, the PID control is inhibited during the "PID Settle Time" so that an accurate reading of PCI coil current can be recorded by the primary and an accurate reading of voltage or current by the SCI.

Error Based Control Loop Timing

The maximum allotted time between adjustments of the primary coil frequency during the PID Active Time for the Error Based Control loop is 4 milliseconds (ms). This control loop is coordinated with the power management system and control timing for powering systems. The error and communications are communicated in conjunction with the power management system and timing control. Timing is controlled and coordinated by the primary wireless power supply using the Power and Control Latency value from the table. The primary and secondary systems coordinate the timing based on the value shared by the maximum value of the sum of the power delta being manipulated.

The current embodiment is one way to use the error control, and one skilled in the art will recognize that the described methodology can be used in many ways to coordinate wireless power control and device power management.

Figure 2:
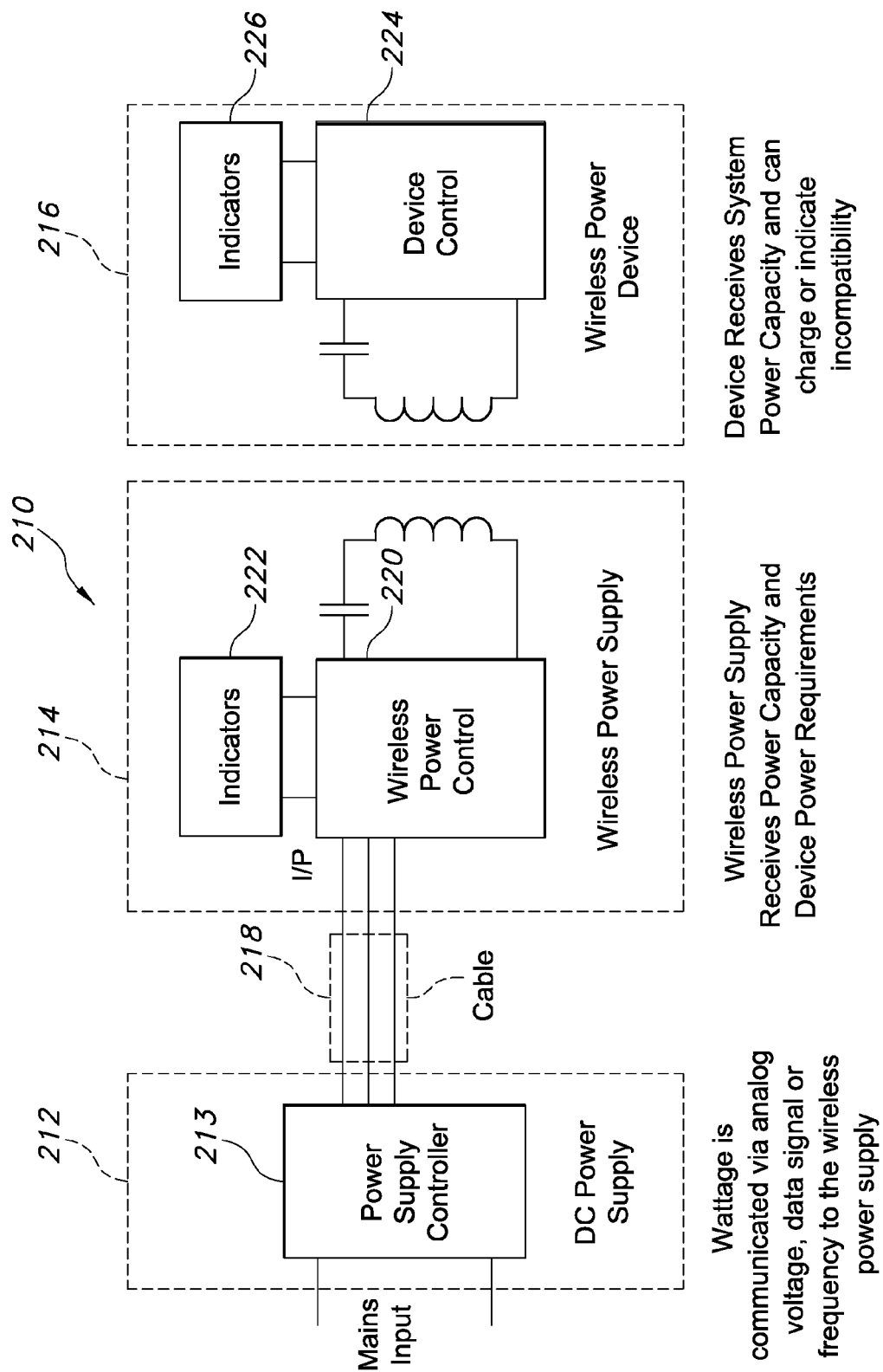
FIG. 2 is a schematic illustration of a wireless charging system constructed in accordance with a first embodiment of the invention.

FIG. 2 shows a system where the power supply, the wireless power supply, and the secondary device all reconcile power to the device. The cable 218 provides a hard-wired connection between the power supply 212 and the wireless power supply 214. The wireless power supply 214 and the wireless power device 216 are inductively coupled as in the prior art.

The wattage of the DC power supply 212 is communicated by way of an analog voltage, a digital signal, or a frequency modulation to the wireless power supply 214. The wireless power supply includes a control 220 and indicators 222. The wireless power supply 214 receives power capacity information from the power supply 212 and device power requirements from the secondary device 216.

The secondary 216 includes a secondary device control 224 and indicators 226. The secondary device 216 receives system power capacity information from the wireless power supply 214 and can charge or indicate incompatibility in response to that information.

It is possible that the power supply 212 has a lower voltage and/or power capacity than the wireless power supply 214. In such case, the wireless power control 220 configures itself so that it is capable of supplying only the power received from the power supply 212.

It also is possible that the voltage and/or power capacity of the power supply 214 is less than the voltage or power requirement of the secondary device 216. In such case, an error signal is indicated on the indicators 222 and/or 226. Additionally, the secondary device control 224 can make a decision regarding whether to not charge at all or whether to charge at the reduced available power level. In response to the decision of the device control 224, the wireless power control 220 can configure itself to not provide power at all or to provide power at the level requested by the secondary device control 224.

Accordingly, the system 210 of FIG. 2 enables 1) power compliance between the secondary device 216 and the wireless power supply 214, 2) communications between the secondary device 216 and the wireless power supply 214, 3) smaller wireless power supplies for charging multiple devices, and 4) use of the device's PMU.

Figure 3:
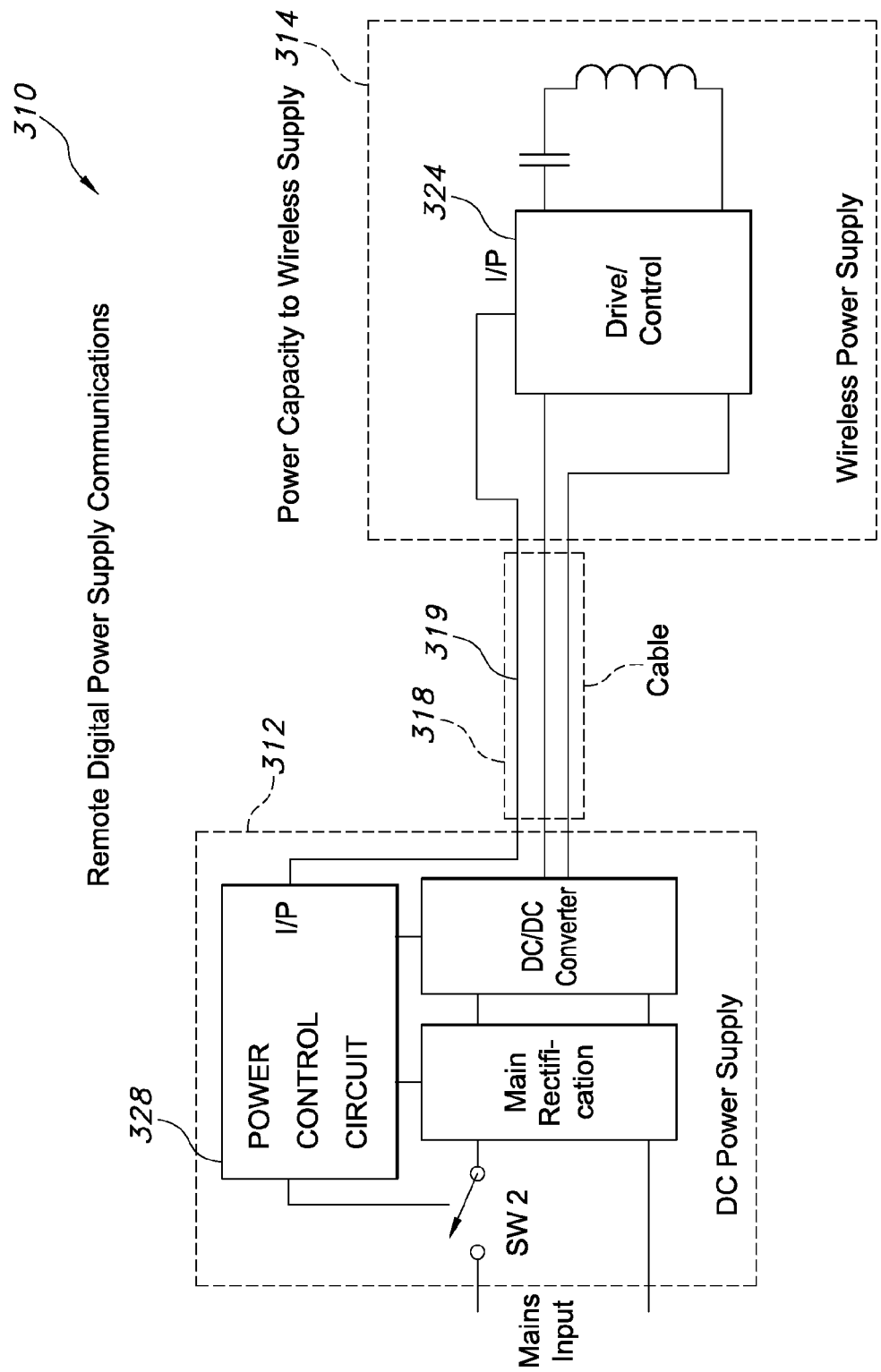
FIG. 3 is a schematic illustration of the power supply side of the wireless charging system.

FIG. 3 shows how the power supply uses the third wire to communicate the power available from the power supply 312 to the wireless power supply 314. This configuration uses a data signal to communicate the power data to the wireless power supply 314. The third wire 319 directly connects the power control circuit 328 of the power supply 312 with the drive control 324 of the wireless power supply 314.

Figure 4:
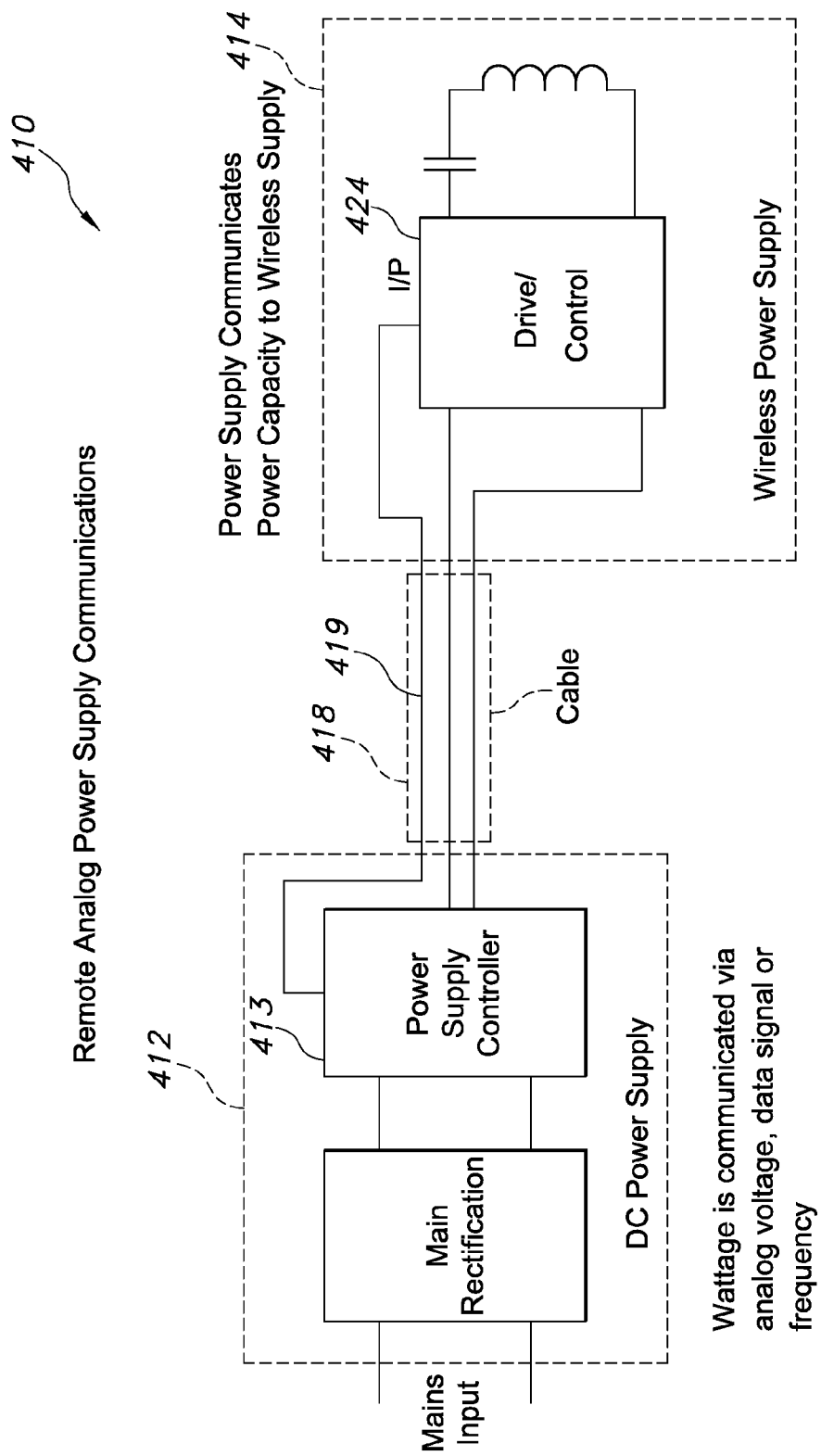
FIG. 4 is a schematic illustration of the wireless charging system in which the third wire communicates analog data.

FIG. 4 shows the third wire 419 communicating analog data that represents the power available from the power supply 412. Accordingly, the system 410 in FIG. 4 is an analog implementation of the system 310 illustrated in FIG. 3. As in previous embodiments, the wattage is communicated by way of the analog voltage, data signal, or frequency. And the power supply 412 communicates power capacity to the wireless power supply 414.

The system 410 illustrated in FIG. 4.5 shows the communications used to communicate information from the power supply 412 and the wireless power supply 414 to the secondary device (not shown). The communications regard the proper power available using a remote power supply 412, a connector 419, and a table to modulate the power within 1% to 2% of expected levels. The power supply 412 changes the rail voltage as illustrated at 430, and the wireless power supply 414 modulates the primary signal as shown at 432 in response to provide communications with the secondary device. Consequently, the primary side communication is modulated from the command signal through communications or a control voltage to a programmable power supply causing the variation.

FIG. 4.6 shows a wireless power supply 414a with the power supply embedded into the wireless power supply and using primary rail voltage modulation for simple commands. The power is varied by one or two percent based on the command signal. The variation can be positive or negative.

FIG. 4.7 shows a wireless power supply 414b including a primary coil shunt 434, the shunt is used to vary the voltage at the primary coil to communicate to the secondary device.

FIG. 4.8 shows a wireless power supply 414a providing a frequency modulated (FM) version of communications using a frequency based controller. The command signal 436, the primary drive signal 438, and the modulated primary drive signal 440 are all shown in alignment time-wise to illustrate the signal variation during communication. Exemplary ASCII codes 442 also are shown. Using the illustrated embodiment, a single look-up table could provide management for multiple secondary devices, such as laptop computers. Additionally, charging may be sequenced for charging multiple devices "simultaneously".

FIGS. 4.85, 4.86, and 4.87 show additional embodiments especially relevant in communicating wireless power to consumers. These embodiments also make wireless power potentially more useable because a five-watt primary can charge a computer—although it will require a prolonged period to do so. Additionally, the computer could be powered off during charging for faster charging. Preferably, the power control system within each secondary device will shut off systems as needed upon knowing the capabilities and requirements and communicating and negotiating these accordingly. Additionally, the communication of this information directly to the user without requiring additional signage or explanation enables a simple "blind" interface to provide the information to the user appropriate to understand the functional limits. A simple logo as shown in 4.87 can represent a substantial amount of additional information to be gathered from the wireless power system.

Additionally, FIG. 4.85 also shows a system that needs additional current to get a very low battery restored. The system can increase the power required by pausing other charging to allow a low battery or additional system requirements to be addressed. This dynamic load management system uses wireless power and communications.

FIG. 4.9 shows a power modulated communications method that allows the primary controller to stop the drive signal for designated periods of time to send basic information. Primary side communications are modulated by power transfer pulses after the secondary sends an identification string to the wireless power supply. Exemplary pulses are shown in the lower left-hand corner of the figure.

Figure 5:
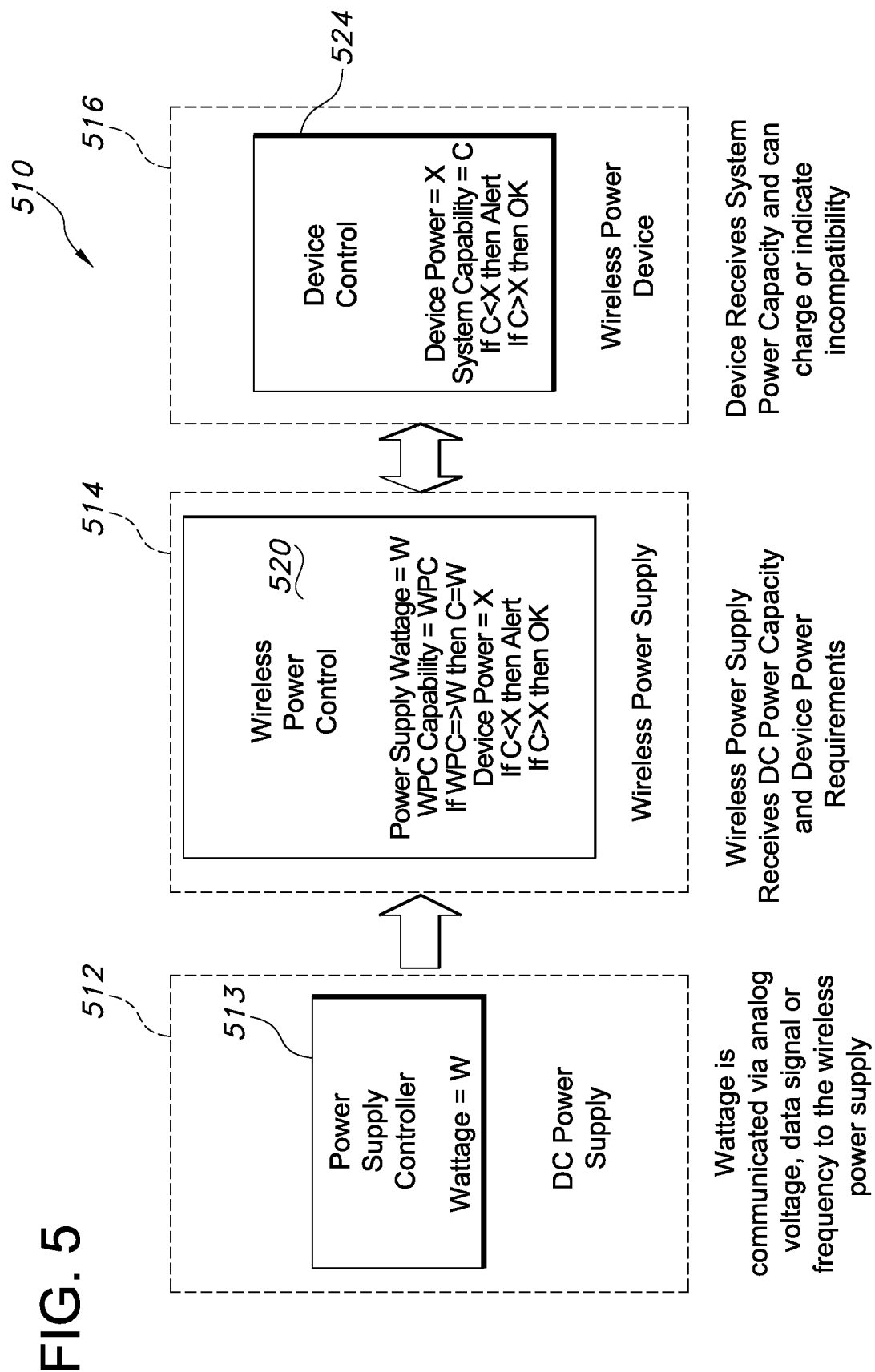
FIG. 5 is a schematic illustration showing how the power is reconciled by the wireless power supply.

FIG. 5 shows a system 510 in which the power is reconciled by the wireless power supply 514. The system 510 allows lesser power supply components and capabilities to drive and to be utilized as shown. These systems can self configure and communicate to the device capacity and availability for charge. The power supply wattage W is communicated by the power supply controller 513 by way of analog voltage, data signal, or frequency modulation to the wireless power supply 514. The WPS 514 receives the DC power capacity from the power supply controller 513 and the device power requirements from the secondary device controllers 524. The secondary device controls 524 receive system power capacity information from the wireless power control 520. The secondary device controllers can charge and/or indicate incompatibility in situations where the device power requirements exceed the system capability. Preset power values can be hard programmed or stored in non-volatile memory systems of the power supply 512, the wireless power supply 514, or the device 516. These values could for example represent factory tested limits, and this information can enable the system and the user to understand the system capacity.

Figure 6:
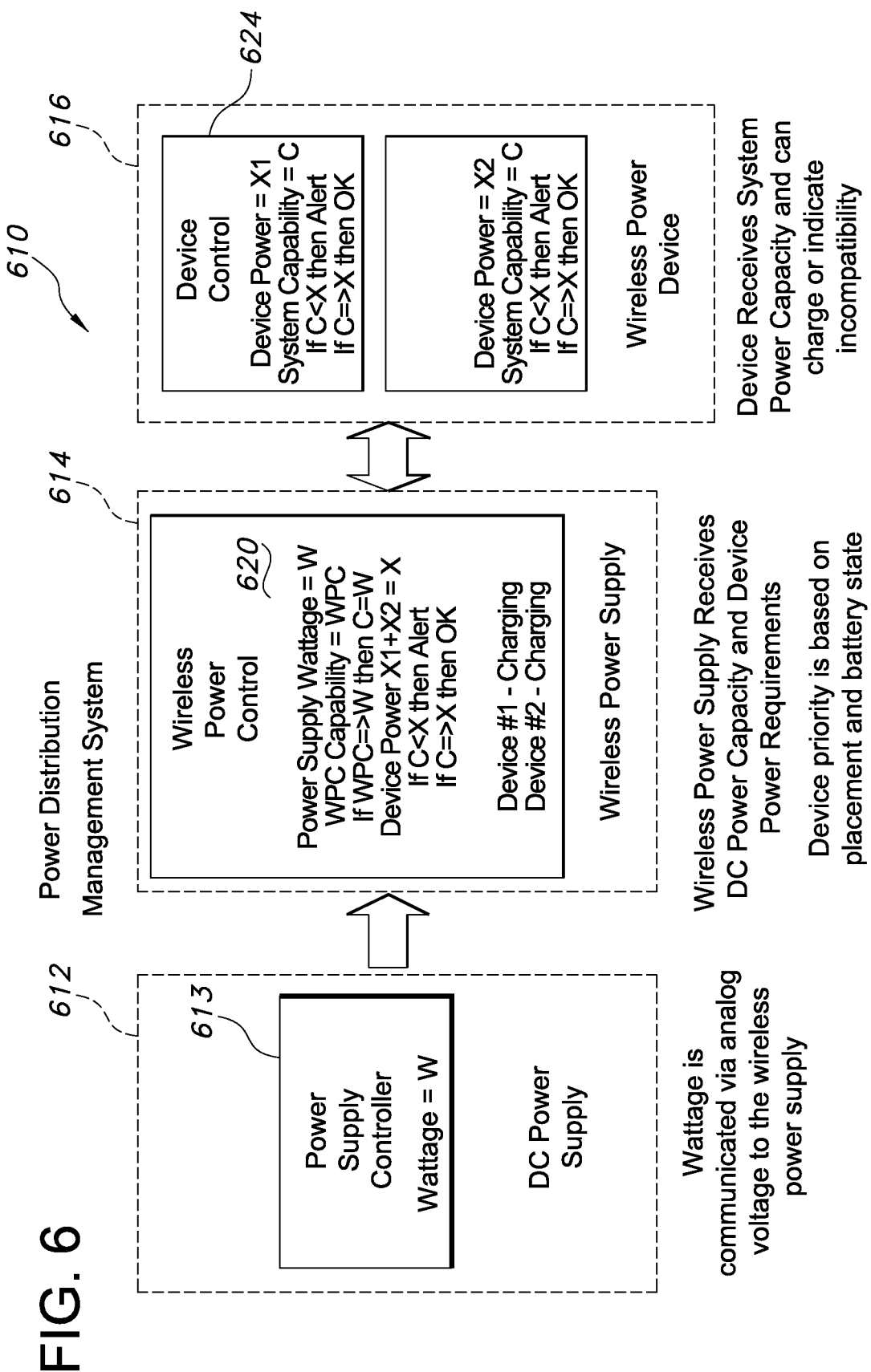
FIG. 6 is a schematic illustration of a power distribution system using the placement of devices as the priority of the charging sequence.

FIG. 6 outlines a power distribution system 610 which uses the placement of devices into proximity with the primary as the priority of the charging sequence. If two devices are placed on a pad that does not have adequate capacity to charge both devices simultaneously, then one secondary device will charge. When power is available for the next unit it will then start to charge as well. The system manages the power distribution within the system limits.

The sequencing of charging depends on the sequence in which the devices are placed on the WPS 614. As charging capacity becomes available, for example, as the first or subsequent devices become charged, the available additional capacity can be used to charge second and/or subsequent devices.

If the wireless power control has capacity C that is less than the combined requirements of the secondary devices X, then an alert is provided on the secondary devices and/or by the WPS 614. In such case, the first device is charged and subsequent devices receive power only as capacity becomes available. Alternatively, the algorithm can be modified to also take into account the state of the battery on one or more of the secondary devices 616. The capacity information or battery state can also be used as a priority charge indicator. For example, if a battery is in a lower or critical state, that status or state can affect priority. This feature may be user selectable within the wireless power supply.

Figure 7:
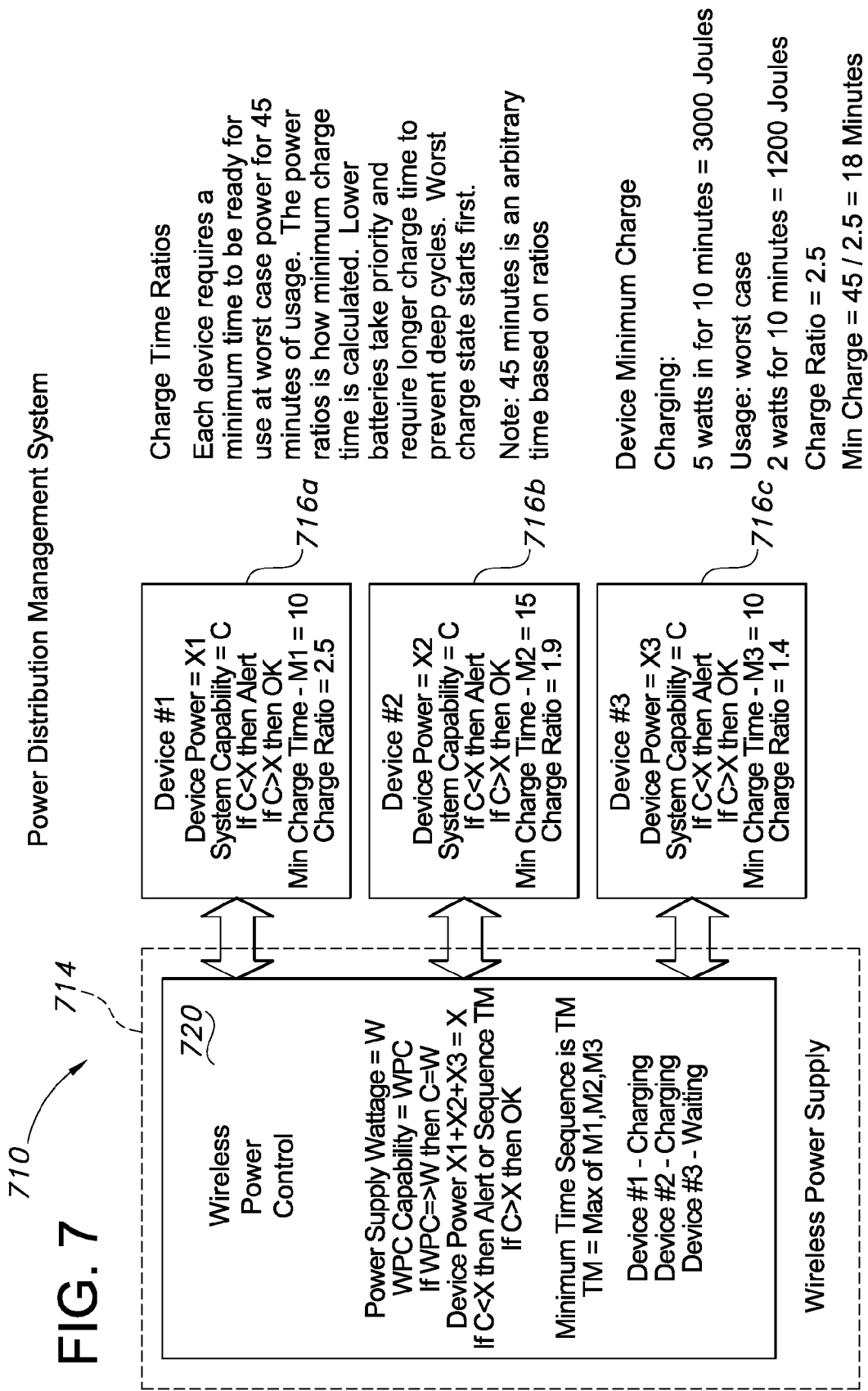
FIG. 7 is a schematic illustration of a power distribution system managing power distribution by understanding power ratios from each device.

FIG. 7 shows yet another modification of the system in which power distribution from the wireless power supply 714 is managed by the wireless power control 720 at least partially in response to power ratios from each secondary device 716a-c. This embodiment enables, for example, a single laptop charger to charge many laptops by understanding the charge status and by rotating the charge based on the charge ratio versus discharge. For example, if three laptops have a 2.5 charge ratio, each can be charged for 15 minutes and get a 45 minute use. This approach would enable a 15-minute cycle for all three units consuming less overall power and allowing a lower cost solution than device specific chargers.

The power ratio is how minimum charge time is calculated. Lower batteries take priority and require longer charge time to prevent deep cycles. The worst-charge state battery starts charging first. The particular charge ratios and power times discussed in this embodiment are illustrative only. Existing secondary devices 716 are capable of monitoring their respective charge cycles.

Figure 8:
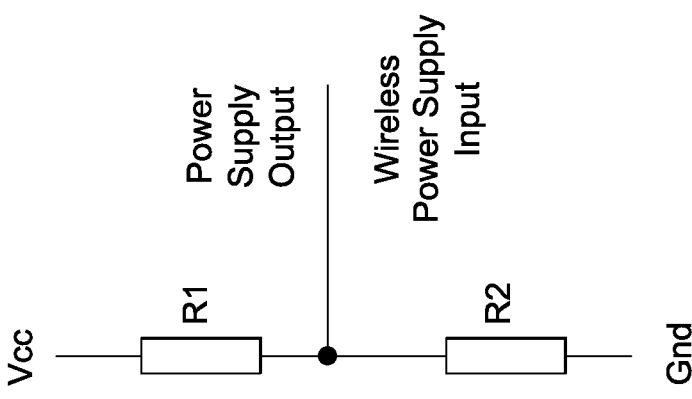
FIG. 8 shows an example of the analog output table to select the wattage of the power supply.

FIG. 8 shows an example of the analog output used to select the wattage of the power supply to implement the analog control method. The control wire 419 shown in FIG. 4 carries the analog signal selected by the resistor configuration shown in the table in FIG. 8. A voltage is scaled, and the table is used to indicate the wattage capacity of the power supply based on the analog selection voltage on line 419 to wireless power supply 424. The preferred method is a digital communications signal for better resolution of limits and capacity information.

Figure 9:
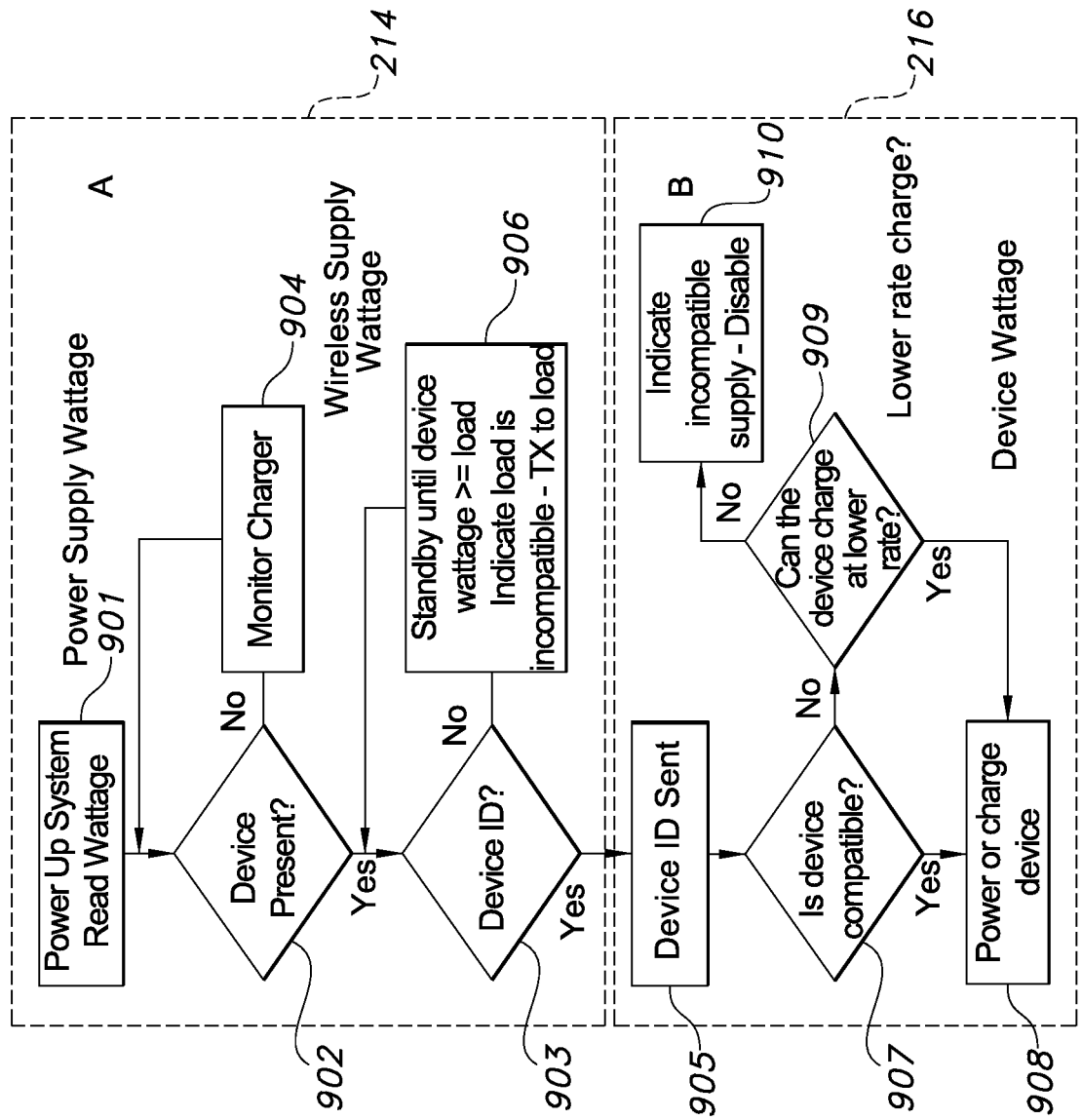
FIG. 9 is a data sequence between the primary source A and the secondary device B.

FIG. 9 shows the data sequence between the wireless power supply 214 and the device 216. Within the wireless power supply, the system powers up 901 and reads the wattage requested by the secondary devices. If a device is present 902, the device identification is read 903. If a device is not present 902, then the system continues to monitor the charger 904. If a device identifier has been detected 903, then the device identification is sent 904 to the secondary device. If the device identification is not detected, the system goes into standby mode 906 until the device wattage is greater than or equal to the load; and the system indicates that the load is incompatible.

Within the secondary device, if the device is compatible 907, then the secondary device is powered and/or charged 908. If the device is not compatible, a decision 909 is made regarding whether the device can charge at a lower rate. If the device cannot charge at a lower rate, then the device and/or the WPS indicate incompatibility 910. If the device is capable of charging at a lower rate, the device is powered 908 at that lower rate.

FIG. 10 shows a basic feedback mechanism including touch and/or sound. This embodiment may be desirable when the user is driving and/or when the device is set down to charge. This method allows less interaction with the user and a positive feedback for proper and improper capacities.

As illustrated in FIG. 10, the current embodiment of the haptic feedback error is three vibrations with delays between each of the three vibrations. A haptic feedback indicating an acceptable condition is a single vibration. Of course, other numbers and/or patterns of vibrations could be used. These patterns would be different than ring, SMS, or email indicators. The present vibration motor used in a portable phone could easily be utilized for such a feedback device that could indicate compatibility or incompatibility without having to see indicators. This is especially favourable in automotive or driving environments.

As also illustrated in FIG. 10, feedback can be provided by way of sound such as beeps and/or tones with a specific intensity (loudness), frequency (pitch), interval (pattern), and timbre (sonority). The frequency, volume, pattern, and/or timber can change as the secondary gets closer to the primary. An exemplary error signal might be alternating between low and high pitch. As with the haptic feedback, indication of an acceptable match might be provided with a single beep, while indication of a incompatibility might be indicated by multiple beeps such as three beeps. If LEDs or other visual indicators are provided on the secondary devices and/or the WPS, one possible indication of compatibility is illuminating a visual indicator continuously, while an indication of incompatibility would be signed by cycling or flashing the visual indicator. Other indications might include display of one or more colors.

FIG. 11 shows a placement sequence table that provides exemplary outcomes and events that can allow a complete charge for many situations while maintaining system simplicity. FIG. 11 is exemplary with all of the devices, wattages, sequencing, and other variables being readily variable as will be recognized by those skilled in the art.

Figure 12:
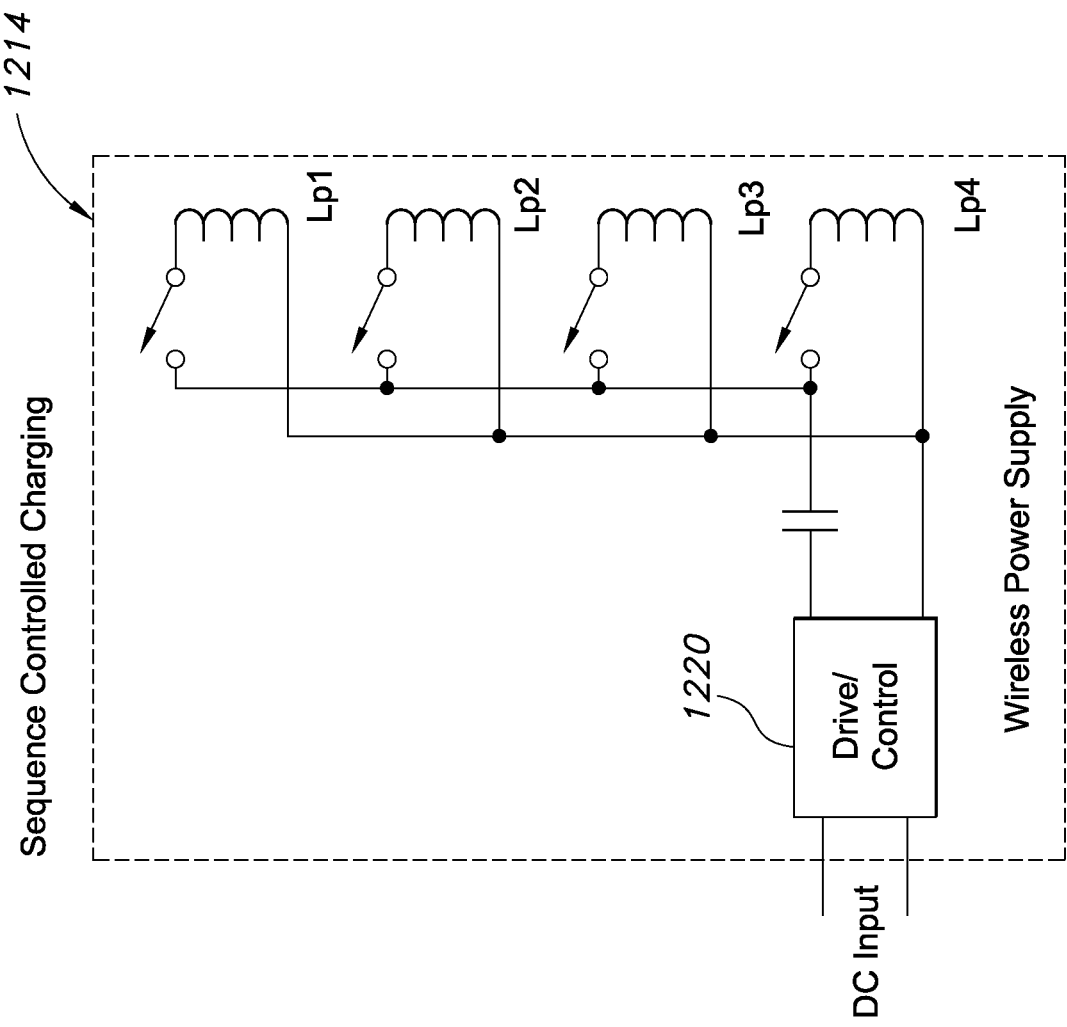
FIG. 12 is a schematic illustration of a fifth alternate embodiment of the primary providing a four-unit charger.

FIG. 12 shows a four-unit charger using the present method. The wireless power supply 1214 includes a plurality of primary coils LP1-LP4. Each coil includes a switch controlled by the WPS control 1220. The switches are controlled by the drive control to selectively charge the devices.

Figure 13:
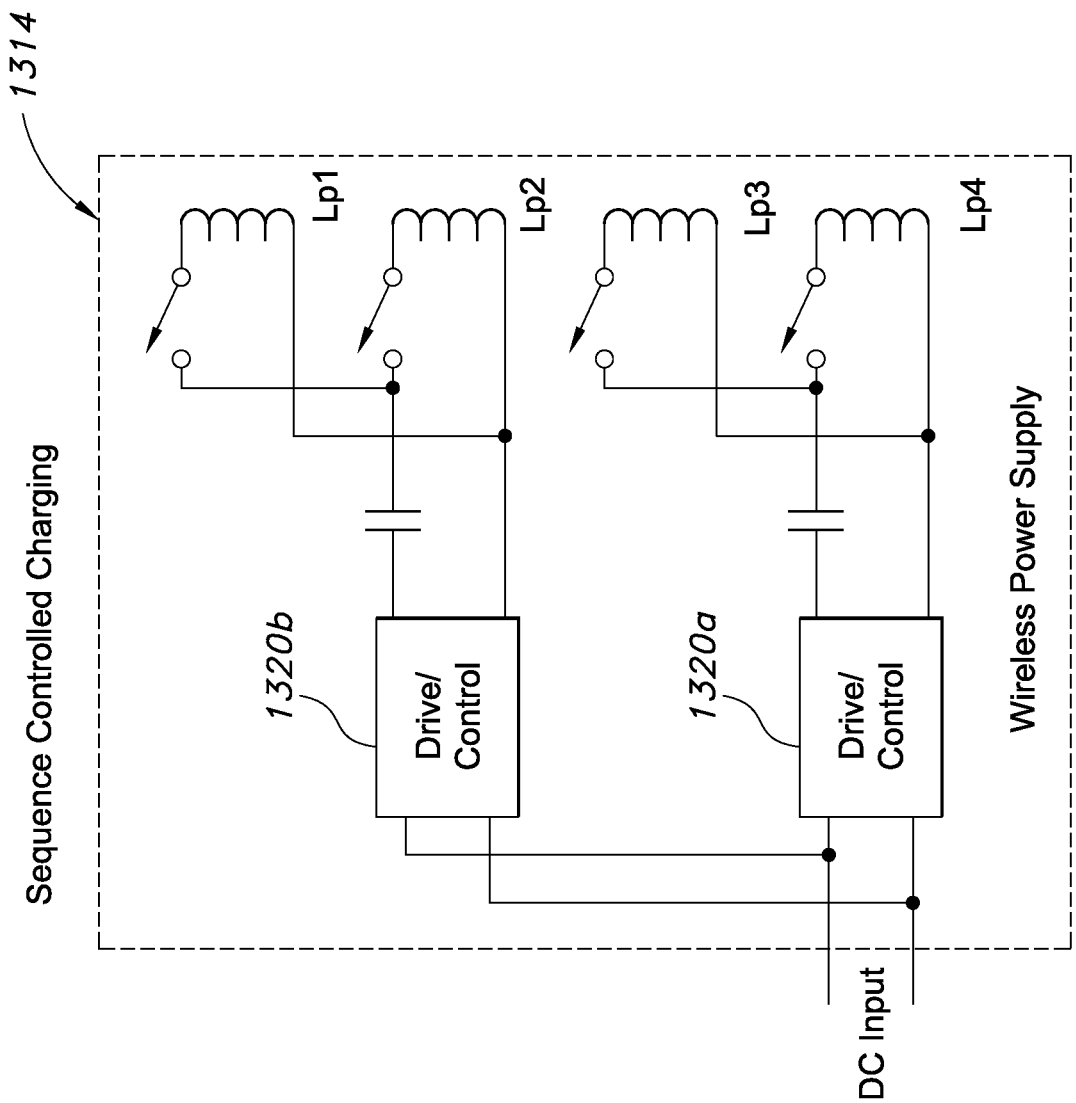
FIG. 13 shows how additional capacity can be added to the primary of FIG. 12.

FIG. 13 shows a WPS 1314 in which additional capacity is provided without needing full power supply coverage for proper distribution. Specifically, WPS 1314 includes two drive controls 1320*a* and 1320*b*, each of which controls two primary coils. Typically each unit or coil would require the maximum power supply support per device. An example of this would be 4 to 5 watt devices or 20 watts. The example in FIG. 13 may provide 10 watts versus FIG. 12 providing 5 watts. These are design configurable for best performance.

As one exemplary use, the WPS's 1214 and 1314 of FIGS. 12 and 13 are appropriate for conference room tables, airplane distribution systems, automotive solutions, and other applications with potentially limited power availability.

FIG. 14 shows a system 1410 and a related method of using the secondary device power management unit (PMU) (not shown) in the secondary device 1416 to better control, regulate, and anticipate power fluctuations. These changes are communicated as or before they happen.

The system 1410 includes a power supply 1412, a wireless power supply 1414, and a wireless power device 1416. All of these components are as previously described. Additionally, the PMU of the device 1416 communicates with the wireless power control 1420 and the device control 1424.

Typical wireless power systems are reactive to the changes in load, and the illustrated approach allows the systems to work together. Secondary commands enable changes based on expected variations. The wireless power supply 1414 uses the device power management unit (PMU) to track and respond to system needs by adjusting the PID in anticipation of the expected power required. This minimizes the time and control issues noted above associated with reacting to the new requirement.

One exemplary load requirement is illustrated in FIG. 14 in which the power is stepped up from a basic power level to additionally sequentially power a backlight and a hard drive. Because the secondary device can anticipate such needs within the device, the secondary device control 1424 can let the wireless power control 1424 "know ahead of time" when power demands will change.

The wireless power control 1424 may communicate directly with the secondary device's power management unit (PMU). That information may be injected into the PID loop. This approach enables the power supply to be built at a smaller capacity.

As described and illustrated, the current embodiments of the invention include one or more of the following:

- A wireless power device with power reconciliation based on the capacity of the primary
- A wireless power system that indicates power availability, warnings, and charge sequence
- A wireless power distribution system that allocates power based on available power, distribution, and device needs
- A device that can indicate power compatibility with a wireless power supply
- A system having haptic, sound, and/or visual feedback for indicating charging, sequencing (of secondary devices), or inability to charge a secondary device
- A wireless power system that transmits wirelessly available capacity and reads secondary device power needs, and reconciles power distribution, sequencing, and availability
- A wireless power system capable of powering multiple secondary devices on a single power supply using priority timing and charge ratios to manage power sequencing
- A wireless power supply that can communicate basic commands from the primary circuit to the secondary device for indicating power compatibility to the user
- A wireless power supply that can sending simple commands for configuring the secondary device for features such as mute, radio off, vibrate, or fee required
- A wireless power supply that can communicate characteristics for configuring the wireless power supply such as impedance and cord resistance, and operating parameters such as voltage, current, and tolerances
- A frequency-based wireless power supply using the rail voltage to control power and send frequency modulated information from the primary to the secondary control
- A frequency based wireless power supply that uses frequency modulation to communicate to the secondary control
- A wireless power system that uses secondary device power management information to control through a wireless link the response and adjustments to changing load requirements
- A wireless power system that is connected to the secondary power management system by way of a wireless link that is sent the PID error information based on expected requirements and not measured error anticipating changes as they happen by the power management unit A wireless power system having a PID control linked to the power management system with preset error adjustments based on the devices being used and the power required A wireless power supply using pre-calculated error percentages as a PID control variable as power management systems are turned on and off A wireless power system including a basic indicator or logo on a charge surface that has additional information that can be communicated to the user for enhanced communications and understanding of the capabilities of that system The above descriptions are those of current embodiments of the invention. Various alterations and changes can be made without departing from the spirit and broader aspects of the invention.

The invention claimed is:

1. A method of controlling an inductive charging system comprising:
   placing a plurality of inductive secondary devices within the operating range of an inductive primary power supply, each of the plurality of inductive secondary devices including a power management unit;
   determining the combined power requests of the secondary devices as a function of information from the plurality of inductive secondary device power management units regarding anticipated power requirements of the plurality of inductive secondary devices;
   comparing the combined power requests of the secondary devices to the power capacity of the primary power supply; and
   if the combined power requests exceed the power capacity, then communicating to at least one secondary device that it will receive power at a reduced level from its power request.

2. A method as defined in claim 1 wherein each power request includes information regarding the charge ratio of a battery associated with the respective secondary device.

3. A method as defined in claim 1 wherein each power request includes information regarding the state of a battery associated with the respective secondary device.

4. A method as defined in claim 1 wherein the communicating step includes communicating to all of the secondary devices that they will receive power at a reduced level from their respective power requests.

5. A method as defined in claim 1 wherein the communicating step includes communicating to at least one other secondary device that it will receive power at its power request.

6. An inductive primary power supply comprising:
   a surface for placing a plurality of inductive secondary devices within the operating range of the inductive primary power supply;
   a primary inductor for inductively transferring power to the plurality of inductive secondary devices;
   an inductive power control circuit configured to:
      control the transfer of inductive power to the plurality of inductive secondary devices;
      receive power requests from the plurality of inductive secondary devices regarding anticipated power requirements of the plurality of inductive secondary devices;
      determine a combined power request of the plurality of inductive secondary devices as a function of the power requests from the plurality of inductive secondary devices;
      compare the combined power request to a power capacity of the inductive primary power supply; and
      if the combined power request exceeds the power capacity, then communicate to at least one of the plurality of inductive secondary devices that it will receive power at a reduced level from its power request.

7. An inductive primary power supply as defined in claim 6 wherein each power request includes information regarding the charge ratio of a battery associated with the respective secondary device.

8. An inductive primary power supply as defined in claim 6 wherein each power request includes information regarding the state of a battery associated with the respective secondary device.

9. An inductive primary power supply as defined in claim 6 wherein the inductive power control circuit, if the combined power request exceeds the power capacity, then communicates to all of the plurality of inductive secondary devices that they will receive power at a reduced level from their respective power requests.

10. An inductive primary power supply as defined in claim 6 wherein the inductive power control circuit, if the combined power request exceeds the power capacity, communicates to at least one other of the plurality of inductive secondary devices that it will receive power at its power request.

11. An inductive primary power supply as defined in claim 6 wherein each of the plurality of inductive secondary devices includes a power management unit.

12. An inductive power supply system comprising:
    a plurality of inductive secondary devices, wherein each of the plurality of inductive secondary devices communicates a power request regarding anticipated power requirements;
    an inductive power supply including:
       a surface for placing the plurality of inductive secondary devices within the operating range of the inductive primary power supply;
       a primary inductor for inductively transferring power to the plurality of inductive secondary devices;
       an inductive power control circuit coupled to the primary inductor, the inductive power control circuit configured to:
          control the transfer of inductive power to the plurality of inductive secondary devices;
          receive power requests from the plurality of inductive secondary devices regarding anticipated power requirements of the plurality of inductive secondary devices;
          determine a combined power request of the plurality of inductive secondary devices as a function of the power requests from the plurality of inductive secondary devices;
          compare the combined power request to a power capacity of the inductive primary power supply; and
          if the combined power request exceeds the power capacity, then communicate to at least one of the plurality of inductive secondary devices that it will receive power at a reduced level from its power request.

13. An inductive power supply system as defined in claim 12 wherein each power request includes information regarding the charge ratio of a battery associated with the respective secondary device.

14. An inductive power supply system as defined in claim 12 wherein each power request includes information regarding the state of a battery associated with the respective secondary device.

15. An inductive power supply system as defined in claim 12 wherein the inductive power control circuit, if the combined power request exceeds the power capacity, then communicates to all of the plurality of inductive secondary devices that they will receive power at a reduced level from their respective power requests.

16. An inductive power supply system as defined in claim 12 wherein the inductive power control circuit, if the combined power request exceeds the power capacity, communicates to at least one other of the plurality of inductive secondary devices that it will receive power at its power request.

17. An inductive primary power supply system as defined in claim 12 wherein each of the plurality of inductive secondary devices includes a power management unit.

* * * * *